(12) United States Patent
Park et al.

(10) Patent No.: US 12,704,920 B2
(45) Date of Patent: Aug. 11, 2026

(54) TRANSPARENT DISPLAY DEVICE WITH TOUCH SENSOR

(71) Applicant: LG Display Co., Ltd., Seoul (KR)

(72) Inventors: JaeHee Park, Paju-si (KR); MiReum Lee, Paju-si (KR); Dojin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/061,164

(22) Filed: Feb. 24, 2025

(65) Prior Publication Data

US 2025/0216962 A1 Jul. 3, 2025

Related U.S. Application Data

(63) Continuation of application No. 18/501,343, filed on Nov. 3, 2023, now Pat. No. 12,260,037.

(30) Foreign Application Priority Data

Jan. 31, 2023 (KR) ........................ 10-2023-0012512

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05); *G06F 2203/04111* (2013.01)

(58) Field of Classification Search
CPC .. G06F 3/0412; G06F 3/04164; G06F 3/0421; G06F 3/044; G06F 3/0445; G06F 3/046; G06F 2203/04111; H10K 59/121; H10K 59/131; H10K 59/40; H10K 59/873
See application file for complete search history.

(56) References Cited

U.S. PATENT DOCUMENTS 10,516,131 B2 * 12/2019 Koike .................... H05B 33/10
2019/0058020 A1 2/2019 Tsai et al.
2019/0163313 A1 5/2019 Kim
2020/0402462 A1 * 12/2020 Takahara ............. G09G 3/2007
2021/0183900 A1 * 6/2021 Choi ................ H10K 59/80515
2021/0242284 A1 8/2021 Kim et al.
2022/0206651 A1 6/2022 Park et al.
2024/0118765 A1 4/2024 Lee et al.

FOREIGN PATENT DOCUMENTS

EP 4 124 937 A1 2/2023

* cited by examiner

*Primary Examiner* — Nelson M Rosario
(74) *Attorney, Agent, or Firm* — Birch, Stewart, Kolasch & Birch, LLP

(57) ABSTRACT

A display device includes a glass substrate, a light shielding layer and a plurality of metal lines on the glass substrate, a buffer layer, at least one transistor disposed on the buffer layer, a data line arranged adjacent to the plurality of metal lines, a pixel power line, a planarization layer disposed on the pixel power line, a light emitting element on the planarization layer, an encapsulation layer, a bank, color filters in each of the plurality of subpixels on the encapsulation layer, and a black matrix between the color filters. Also, the black matrix overlaps the bank, the plurality of metal lines has a mesh structure, and the plurality of metal lines include a first metal line and a second metal line with the second metal line intersected to the first metal line and connected to the first metal line.

19 Claims, 17 Drawing Sheets

FIG. 7

112
150
140
130
125
120
PLN
PAS2
PAS1
ILD
BF
111
VII'
BM
CF
BM
CF
BM
TBL2
CH3
TL
TL
DL
L2
L1
VSSL
DL
RL
DL
L2
L1
VDDL
DL
TL
TL
BL1
TBL1
CH2
TBL2
VII
X
Z
Y

TRANSPARENT DISPLAY DEVICE WITH TOUCH SENSOR

CROSS-REFERENCE TO RELATED APPLICATIONS

This application is Continuation of application Ser. No. 18/501,343, filed on Nov. 3, 2023 (now U.S. Pat. No. 12,260,037, issued on Mar. 25, 2025), which claims the benefit under 35 U.S.C. § 119 (a) to Patent Application No. 10-2023-0012512, filed in Republic of Korea on Jan. 31, 2023, which is hereby expressly incorporated by reference into the present application.

BACKGROUND

Technical Field

The present disclosure relates to a transparent display device with a touch sensor.

Description of the Related Art

A transparent display device allows a user to view objects or images positioned at an opposite side through the display device. In more detail, the transparent display device includes a display area having a transmissive area with a high light transmittance transmitting external light and a non-transmissive area. The transparent display device also includes touch sensors and touch lines for implementing a touch function.

SUMMARY

Accordingly, one object of the present disclosure is to simplify the process of forming the touch sensors and touch lines.

Another object of the present disclosure is to provide a transparent display device that can minimize loss of light transmittance due to a touch sensor and a touch line.

Yet another object of the present disclosure is to provide a transparent display device that can ensure a high touch performance.

To achieve these and other advantages and in accordance with the purpose of the present invention, as embodied and broadly described herein, the present disclosure provides in one aspect a transparent display device with a touch sensor. The transparent display device includes a substrate provided with a transmissive area and a non-transmissive area, a touch sensor disposed in the transmissive area and including a touch sensor electrode, a touch line provided in the non-transmissive area and extended in a first direction, a touch bridge line provided in the non-transmissive area and extended in a second direction and connected to the touch line, and a touch contact electrode electrically connected to the touch bridge line and provided to overlap at least a portion of the touch sensor electrode. The touch contact electrode includes a plurality of contact areas contacting the touch sensor electrode.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and other advantages of the present disclosure will be more clearly understood from the following detailed description taken in conjunction with the accompanying drawings, in which:

FIG. 7 is a view illustrating an example of a sensing transistor and a touch connection portion, which are provided in an area C of FIG. 3;

DETAILED DESCRIPTION

Figure 1:
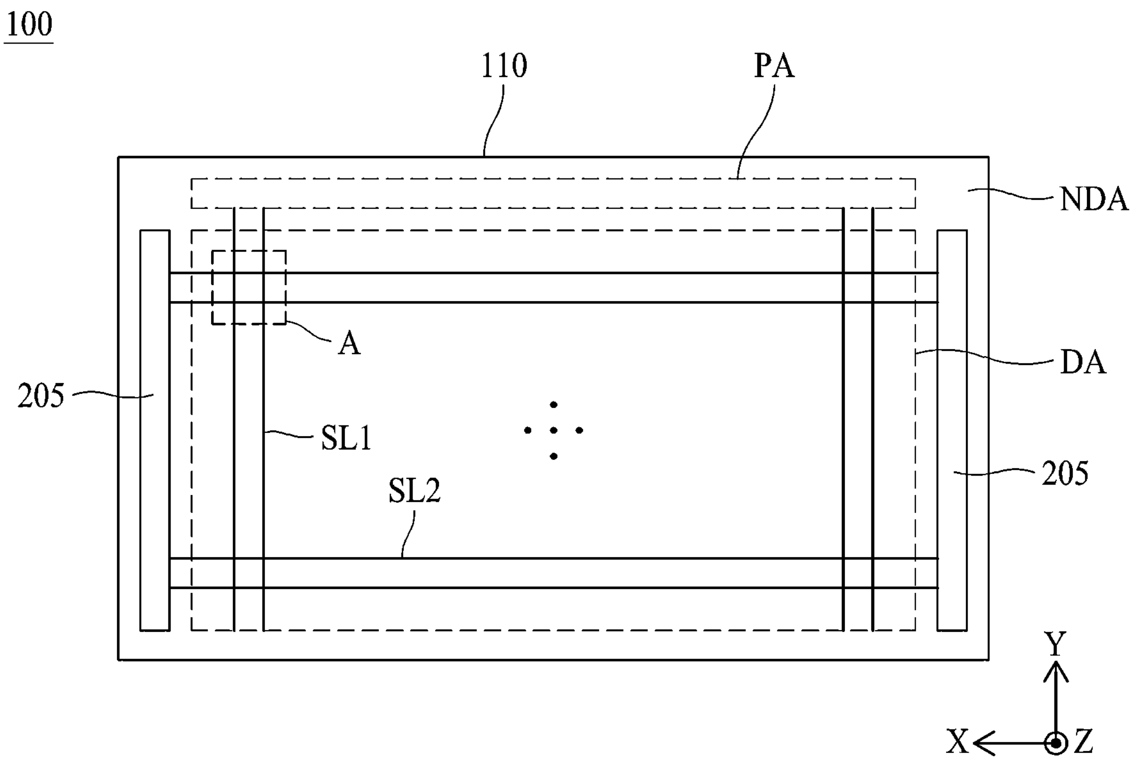
FIG. 1 is a schematic plan view illustrating a transparent display panel.

Advantages and features of the present disclosure, and implementation methods thereof will be clarified through following embodiments described with reference to the accompanying drawings. The present disclosure can, however, be embodied in different forms and should not be construed as limited to the embodiments set forth herein.

A shape, a size, dimensions (e.g., length, width, height, thickness, radius, diameter, area, etc.), a ratio, an angle, and a number of elements disclosed in the drawings for describing embodiments of the present disclosure are merely an example, and thus, the present disclosure is not limited to the illustrated details. A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

Like reference numerals refer to like elements throughout the specification. In the following description, when the detailed description of the relevant known function or configuration is determined to unnecessarily obscure the important point of the present disclosure, the detailed description will be omitted. When 'comprise,' 'have,' and 'include' described in the present specification are used, another part can be added unless 'only~' is used. The terms of a singular form can include plural forms unless referred to the contrary.

In construing an element, the element is construed as including an error range although there is no explicit description. In describing a position relationship, for example, when the position relationship is described as 'upon~,' 'above~,' 'below~,' and 'next to~,' one or more portions can be arranged between two other portions unless 'just' or 'direct' is used. Although the terms "first," "second," etc., can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc., can be used. These terms are intended to identify the corresponding elements from the other elements, and basis, order, or number of the corresponding elements are not limited by these terms. The expression that an element is "connected" or "coupled" to another element should be understood that the element can directly be connected or coupled to another element but can directly be connected or coupled to another element unless specially mentioned, or a third element can be interposed between the corresponding elements.

Features of various embodiments of the present disclosure can be partially or overall coupled to or combined with each other, and can be variously inter-operated with each other and driven technically as those skilled in the art can sufficiently understand. The embodiments of the present disclosure can be performed independently from each other, or can be performed together in a co-dependent relationship.

FIG. 1 is a schematic plan view illustrating a transparent display panel 110 of a transparent display device 100. As shown, the X axis indicates a line parallel with a scan line, Y axis indicates a line parallel with a data line, and Z axis indicates a height direction of the transparent display device 100. The transparent display device 100 can be an organic light emitting display device, or as a liquid crystal display device, a plasma display panel (PDP), a Quantum dot Light Emitting Display (QLED) or an Electrophoresis display device, for example.

Referring to FIG. 1, the transparent display panel 110 includes a display area DA provided with pixels to display an image, and a non-display area NDA where an image is not displayed. Further, the display area DA includes first signal lines SL1, second signal lines SL2 and the pixels. Also, the non-display area NDA includes a pad area PA in which pads are disposed, and at least one gate driver 205.

As shown in FIG. 1, the first signal lines SL1 extend in a first direction (e.g., Y-axis direction) and cross the second signal lines SL2 in the display area DA. The second signal lines SL2 extend in the display area DA in a second direction (e.g., X-axis direction). The pixels are provided in an area where the first signal line SL1 and the second signal line SL2 are provided, and emit a predetermined light to display an image.

Further, the gate driver 205 is disposed in the non-display area NDA on one side or both sides of the display area DA by a gate driver in panel (GIP) method or a tape automated bonding (TAB) method. The gate driver 205 supplies scan signals to the connected scan lines.

In addition, to implement a touch function, the transparent display panel 110 further includes a touch line and a touch sensor in addition to the first signal line SL1, the second signal line SL2 and the pixel. In more detail, FIG. 2 is a schematic view illustrating an example of a pixel provided in an area A of FIG. 1, and FIG. 3 is a view illustrating an example of signal lines, touch lines and a touch sensor, which are provided in an area B of FIG. 2.

Figure 2:
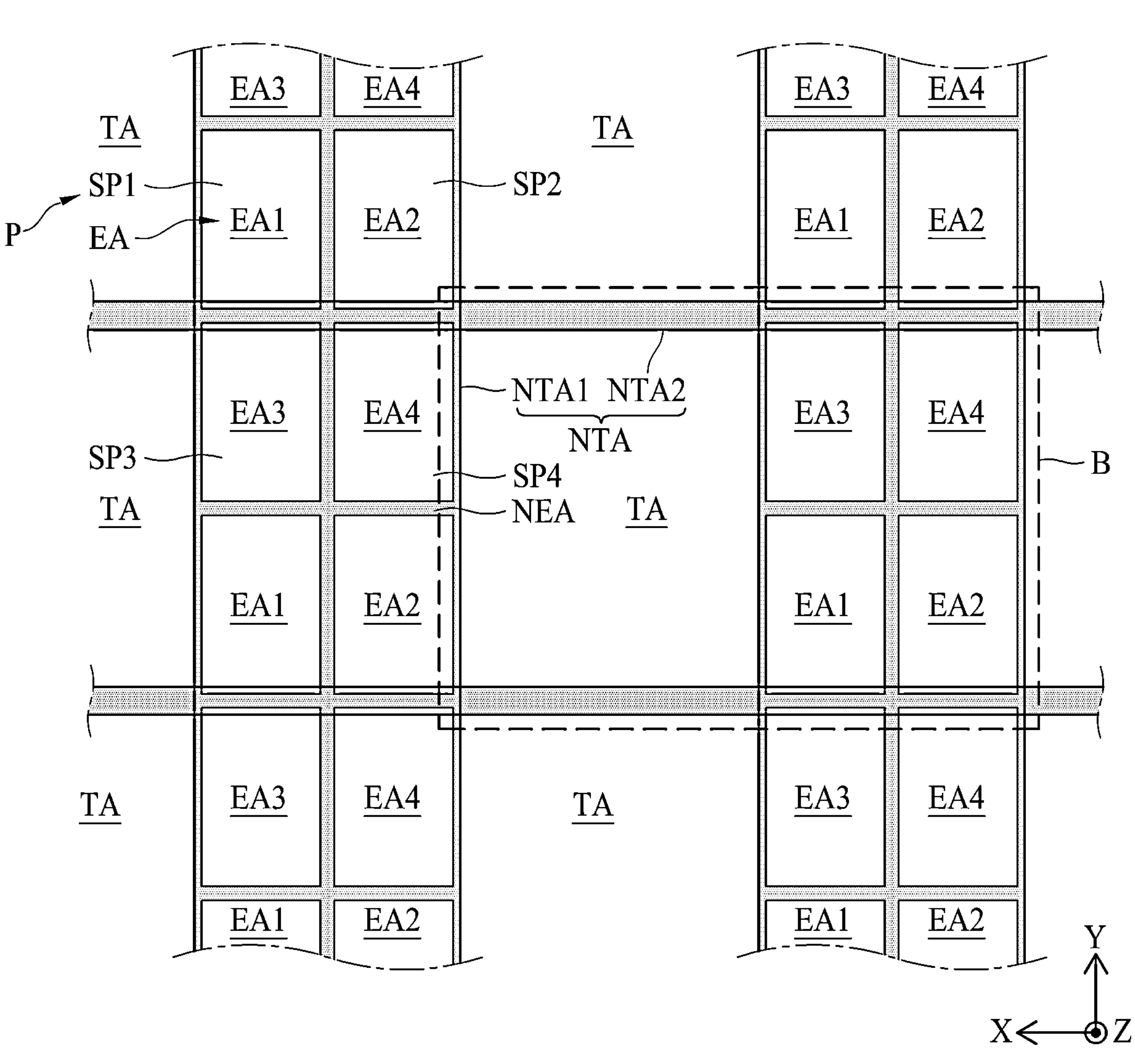
FIG. 2 is a schematic view illustrating an example of a pixel provided in an area A of FIG. 1.
Figure 3:
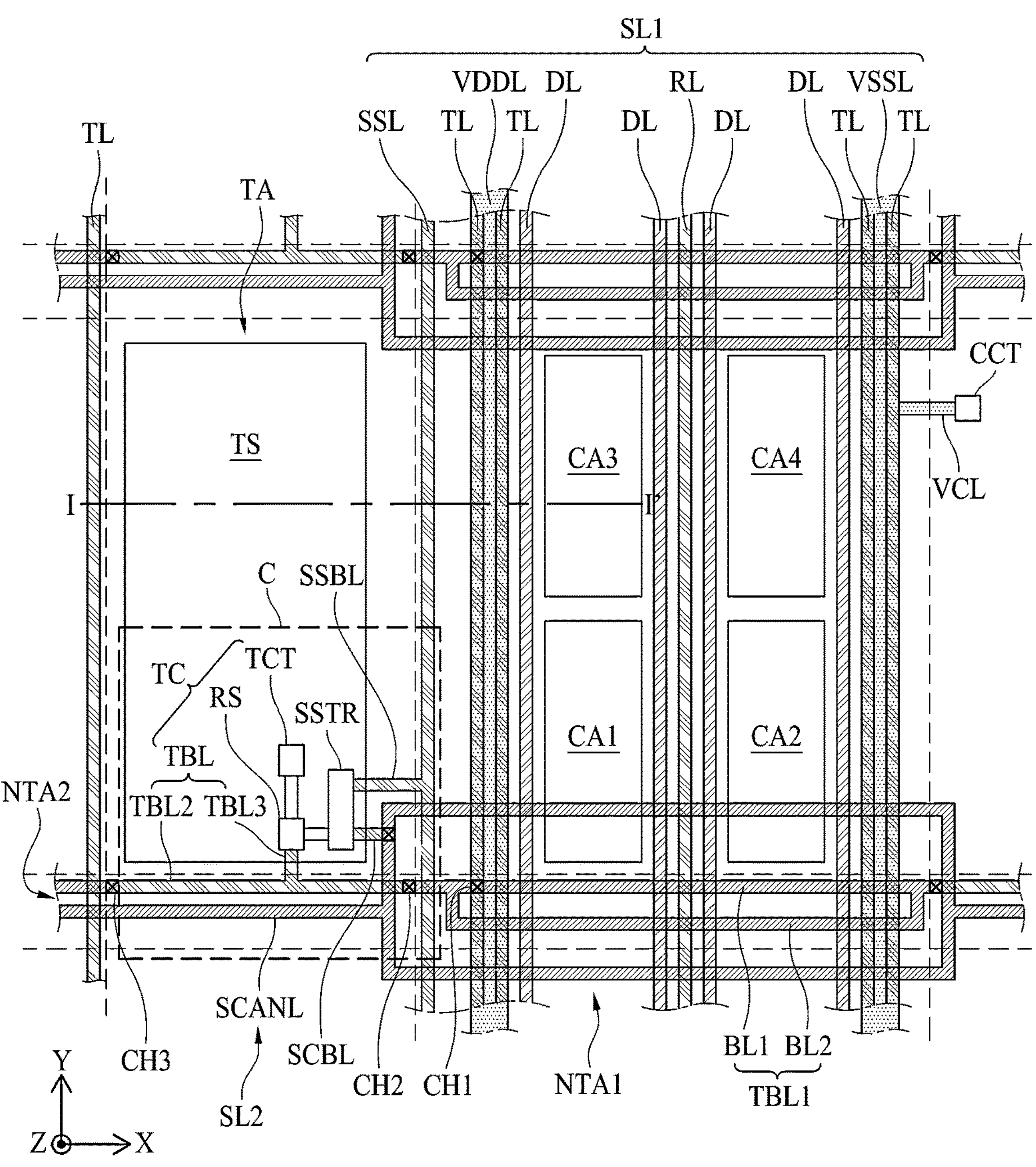
FIG. 3 is a view illustrating an example of signal lines, touch lines and a touch sensor, which are provided in an area B of FIG. 2.

As shown in FIG. 2, the display area DA includes a transmissive area TA and a non-transmissive area NTA. The transmissive area TA is an area through which most of externally incident light passes, and the non-transmissive area NTA is an area through which most of externally incident light fails to transmit. For example, the transmissive area TA can be an area where light transmittance is greater than α%, and the non-transmissive area NTA can be an area where light transmittance is smaller than β%. In addition, α is greater than β. A user can also view an object or background arranged over a rear surface of the transparent display panel 110 due to the transmissive area TA.

Further, the non-transmissive area NTA includes a first non-transmissive area NTA1, a second non-transmissive area NTA2 and a plurality of pixels P. The pixels P also at least partially overlap at least one of the first signal line SL1 and the second signal line SL2, thereby emitting predetermined light to display an image. In addition, a light emission area EA corresponds to an area, from which light is emitted, in the pixel P.

As shown in FIG. 2, each pixel P includes at least one of a first subpixel SP1, a second subpixel SP2, a third subpixel SP3 and a fourth subpixel SP4. The first subpixel SP1 includes a first light emission area EA1 emitting light of a first color, the second subpixel SP2 includes a second light emission area EA2 emitting light of a second color, the third subpixel SP3 includes a third light emission area EA3 emitting light of a third color, and the fourth subpixel SP4 includes a fourth light emission area EA4 emitting light of a fourth color.

In addition, the first to fourth light emission area EA1, EA2, EA3 and EA4 can emit light of different colors. For example, the first light emission area EA1 can emit light of a green color, the second light emission area EA2 can emit light of a red color, the third light emission area EA3 can emit light of a blue color, and the fourth light emission area EA4 can emit light of a white color. However, the light emission areas are not limited to this example. Also, the arrangement order of the subpixels SP1, SP2, SP3 and SP4 can be changed in various ways.

In addition, the first non-transmissive area NTA1 extends in a first direction (e.g., Y-axis direction) in a display area DA, and can be disposed to at least partially overlap light emission areas EA1, EA2, EA3 and EA4. A plurality of the first non-transmissive areas NTA1 are provided in the transparent display panel 110, and the transmissive area TA is provided between two adjacent first non-transmissive areas NTA1. Also, in the first non-transmissive area NTA1, the first signals lines SL1 extending in the first direction (e.g., Y-axis direction) are spaced apart from each other.

Further, as shown in FIG. 3, the first signal lines SL1 can include at least one of a pixel power line VDDL, a common power line VSSL, a reference line RL and data lines DL. The pixel power line VDDL supplies a first power source to a driving transistor DTR (FIG. 6) of each subpixel SP1-SP4 provided in the display area DA. In addition, the common power line VSSL supplies a second power source to a cathode electrode of the subpixels SP1-SP4 provided in the display area DA. Also, the second power source can be a common power source commonly supplied to the subpixels SP1-SP4.

Further, the common power line VSSL supplies the second power source to the cathode electrode through a cathode contact electrode CCT. In more detail, the cathode contact electrode CCT is provided between the transmissive area TA and the common power line VSSL. Also, a power connection line VCL is disposed between the common power line VSSL and the cathode contact electrode CCT. One end of the power connection line VCL is connected to the common power line VSSL and the other end thereof is connected to the cathode contact electrode CCT. The cathode electrode is also connected to the cathode contact electrode CCT. As a result, the cathode electrode can be electrically connected to the common power line VSSL through the power connection line VCL and the cathode contact electrode CCT.

In addition, the reference line RL supplies an initialization voltage (or sensing voltage) to the driving transistor DTR of each subpixel SP1-SP4 provided in the display area DA. The reference line RL can also be disposed between the data lines DL. For example, the reference line RL can be disposed at the center of the four data lines DL, that is, between the second data line DL and the third data line DL.

In addition, the reference line RL diverges and connects to the subpixels SP1-SP4. In more detail, the reference line RL can be connected to circuit elements of the subpixels SP1-SP4 to supply an initialization voltage (or sensing voltage) to each subpixel SP1-SP4.

Further, each data line DL supplies a data voltage to the subpixels SP1-SP4. For example, one data line DL can supply a first data voltage to a first driving transistor of the first subpixel SP1, and another data line DL can supply a second data voltage to a second driving transistor of the second subpixel SP2. Yet another data line DL can supply a third data voltage to a third driving transistor of the third subpixel SP3 and still another data line DL can supply a fourth data voltage to a fourth driving transistor of the fourth subpixel SP4. The first signal lines SL1 can also include touch lines TL and sensing lines SSL.

In the transparent display panel 110 according to one embodiment of the present disclosure, the touch line TL is further disposed in the first non-transmissive area NTA1. In addition, at least two touch lines TL can be provided in the first non-transmissive area NTA1. However, when the touch lines TL are disposed in the transmissive area TA of the transparent display panel 110, the light transmittance may be deteriorated due to the touch lines TL.

Also, a slit, specifically an elongated linear or rectangular shape, is provided between the touch lines TL. When external light passes through the slit, a diffraction phenomenon may occur. That is, according to the diffraction phenomenon, light corresponding to plane waves are changed to spherical waves as the light passes through the slit, and an interference phenomenon occurs in the spherical waves. Therefore, constructive interference and destructive interference occur in the spherical waves, whereby the external light that has passed through the slit may have an irregular light intensity. As a result, in the transparent display panel 110, the definition of an object or image positioned at an opposite side may be reduced. Thus, there is some technical benefits to dispose the touch lines TL in the first non-transmissive area NTA1 rather than the transmissive area TA.

In addition, as shown in FIG. 3, a plurality of touch lines TL can be disposed between first signal lines SL1 in the first non-transmissive area NTA1 and the transmissive area TA. For example, four touch lines TL can be disposed in one first non-transmissive area NTA1, two touch lines TL can be disposed between the circuit areas CA1-CA4 and the transmissive area TA disposed on the right of the circuit areas CA1-CA4, and the other two touch lines TL can be disposed between the circuit areas CA1-CA4 and the transmissive area TA disposed on the left of the circuit areas CA1-CA4, but are not limited to this arrangement. The touch lines TL do not overlap the circuit areas CA1-CA4 in which circuit elements are disposed, and various modifications can be made in the arrangement order of the touch lines TL with the first signal lines SL1.

In addition, the sensing line SSL can be further disposed in the first non-transmissive area NTA1. In more detail, the sensing line SSL detects whether a short-circuit occurs between a cathode electrode of a light emitting element and a touch sensor electrode of a touch sensor TS. Further, the sensing line SSL can sense a voltage applied to the touch sensor electrode of the touch sensors TS through a sensing transistor SSTR. In addition, the sensing line SSL can be disposed to be adjacent to the transmissive area TA in the first non-transmissive area NTA1. In more detail, the sensing line SSL can be disposed between the touch lines TL and the transmissive area TA.

Further, the transparent display panel 110 includes a pixel P between adjacent transmissive areas TA. In particular, the pixel P can include light emission areas EA1, EA2, EA3 and EA4 in which a light emitting element is disposed to emit light. Because the non-transmissive area NTA in the transparent display panel 110 has a small area, a circuit element can be disposed to at least partially overlap the light emission areas EA1-EA4.

Further, the touch lines TL do not overlap the circuit areas CA1, CA2, CA3 and CA4, whereby a parasitic capacitance of the touch lines TL due to the circuit elements can be reduced or minimized. Also, the transparent display panel 110 according to an embodiment of the present disclosure can reduce a horizontal distance difference between the touch lines TL and improve uniformity of the parasitic capacitance.

In addition, the second non-transmissive area NTA2 extends in the display area DA in a second direction (e.g., X-axis direction), and can be disposed to at least partially overlap the light emission areas EA1-EA4. A plurality of second non-transmissive areas NTA2 can be provided in the transparent display panel 110, and the transmissive area TA can be provided between two adjacent second non-transmissive areas NTA2. Also, the second signal line SL2 can be disposed in the second non-transmissive area NTA2.

As shown in FIG. 3, the second signal line SL2 extends in a second direction (e.g., X-axis direction), and can include, for example, a scan line SCANL supplying a scan signal to subpixels SP1-SP4 of the pixel P, or supplying the scan signal to the sensing transistor SSTR. In addition, the second signal line SL2 can further include a touch bridge line TBL connecting any one of the touch lines TL with a touch sensor TS. The touch bridge line TBL can be connected to any one of the touch lines TL through a first contact hole CH1. The touch bridge line TBL can be connected to at least two touch sensors TS arranged in the second direction (e.g., X-axis direction) while extending in the second direction (e.g., X-axis direction).

Further, the touch lines TL can be disposed in the first non-transmissive area NTA1 that is not the second non-transmissive area NTA2, whereby the light transmittance can be prevented from being deteriorated due to the touch lines TL. In addition, as shown in FIG. 3, the second non-transmissive area NTA2 extended in the second direction (e.g., X-axis direction) crosses between adjacent transmissive areas TA. Also, when a width of the second non-transmissive area NTA2 crossing the transmissive areas TA is increased, a size of the transmissive area TA is reduced.

In addition, when the touch lines TL are disposed in the second non-transmissive area NTA2, the width of the second non-transmissive area NTA2 is increased to include a larger number of lines, and the size of the transmissive area TA is reduced. Thus, the light transmittance of the transparent display panel 110 is reduced due to the touch lines TL.

Further, in one embodiment, the touch lines TL are disposed in the first non-transmissive area NTA1, and only one touch bridge line TBL for connecting the touch sensors TS is provided in the second non-transmissive area NTA2. Therefore, the transparent display panel 110 according to one embodiment of the present disclosure can reduce or minimize the decrease in size of the transmissive area TA or decrease in light transmittance due to the touch lines TL and the touch bridge line TBL.

In addition, the touch sensor TS is provided in the transmissive area TA. In more detail, the touch sensor TS can be disposed in each transmissive area TA, and changes in capacitance during a user contact. A touch driver is also connected to the touch sensors TS through the touch lines TL to detect a change in the capacitance of the touch sensors TS. The touch sensors TS can also correspond to the pixels P in a one-to-one correspondence.

Hereinafter, a connection relationship among touch sensors TS, touch lines TL and touch bridge lines TBL will be described in more detail with reference to FIGS. 4 and 5. In particular, FIG. 4 is a view illustrating a connection relationship between a plurality of touch blocks and a plurality of touch lines, and FIG. 5 is a view illustrating a connection relationship between a plurality of touch lines and a plurality of touch sensors in one touch block.

Figure 4:
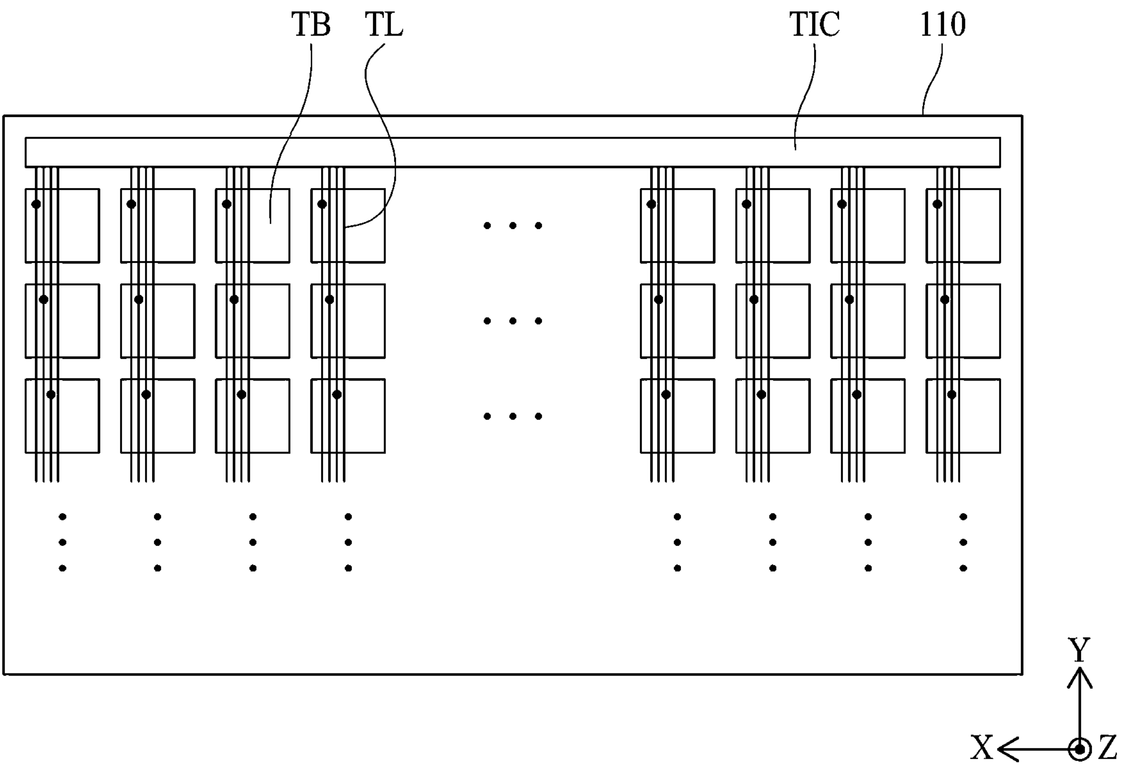
FIG. 4 is a view illustrating a connection relation between a plurality of touch blocks and a plurality of touch lines.
Figure 5:
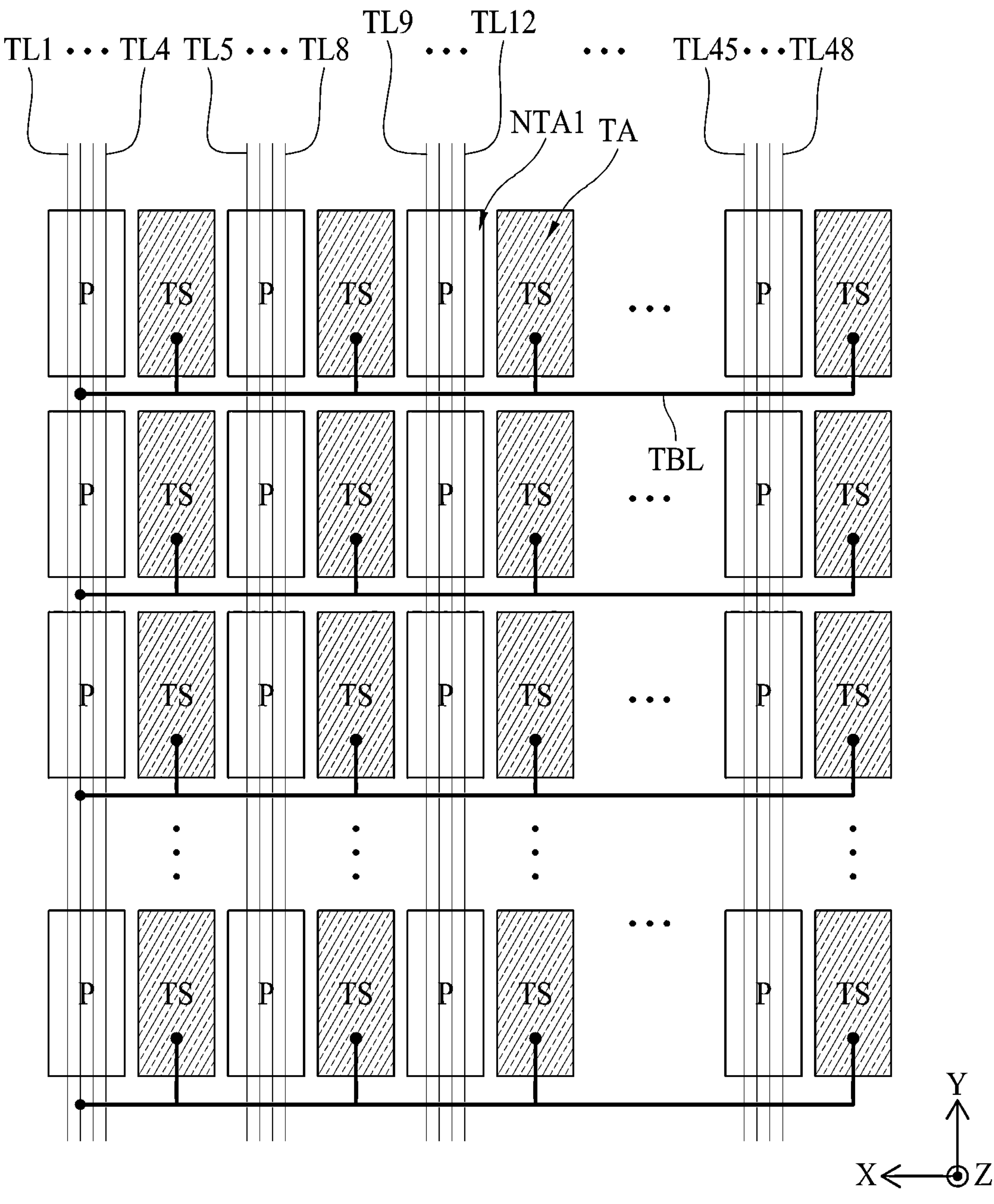
FIG. 5 is a view illustrating a connection relation between a plurality of touch lines and a plurality of touch sensors in one touch block.

Referring to FIGS. 4 and 5, the transparent display panel 110 includes a plurality of touch blocks TB. Each touch block TB includes a plurality of pixels P and a plurality of transmissive areas TA disposed to correspond to the pixels P one-to-one as a basic unit for determining a user touch position.

The transparent display panel 110 also includes touch sensors TS provided in each transmissive area TA. For example, each touch block TB can include 12×20 pixels P and 12×20 touch sensors TS. In this instance, when the image resolution is 1920×960, the touch resolution can be 160×48.

Further, as each touch line TL is connected to one of the touch blocks TB, a change in capacitance of the touch sensors TS provided in the connected touch block TB can be sensed. That is, the touch lines TL provided in the transparent display panel 110 can correspond to the touch blocks TB in a one-to-one manner. Therefore, the number of touch lines TL can be the same as the number of touch blocks TB in the transparent display panel 110. For example, when the number of touch blocks TB is 160×48, the touch line TL can also be 160×48, and can be connected to the touch driver TIC.

As described above, to form the touch lines TL as much as the number of touch blocks TB, at least two touch lines TL are provided in one first non-transmissive area NTA1. For example, when an image resolution is 1920×960 and touch resolution is 160×48, four touch lines TL can be provided in one first non-transmissive area NTA1, as shown in FIG. 3, to form 160×48 touch lines TL in the transparent display panel 110.

As shown in FIG. 5, the touch sensors TS provided in one touch block TB can be connected to one of the touch lines TL provided in one touch block TB. For example, twelve first non-transmissive areas NTA1 can be provided in one touch block TB, and four touch lines TL can be disposed in each of the twelve first non-transmissive areas NTA1. As a result, one touch block TB can be provided with 48 touch lines TL1, . . . , TL48. In this instance, the touch sensors TS provided in one touch block TB can be connected to one specific touch line TL of the 48 touch lines TL1, . . . , TL48. In addition, the specific touch line TL can be connected to the touch sensors TS arranged in the second direction (e.g., X-axis direction) through the touch bridge lines TBL extending in the second direction (e.g., X-axis direction). As a result, the touch sensors TS provided in one touch block TB can be electrically connected to each other through the specific touch line TL and the touch bridge lines TBL.

In addition, each touch line TL can correspond to the touch blocks TB in a one-to-one manner. Therefore, the touch blocks TB are connected to different touch lines TL and thus can be electrically separated from each other. Further, each touch line TL can connect a plurality of touch sensors TS provided in a corresponding touch block TB to a touch driver TIC. In more detail, each touch line TL can transmit the changed capacitance provided from the touch sensors TS in the touch block TB to the touch driver TIC. The touch driver TIC can thus sense the changed capacitance, and can determine a user touch position. Also, each touch line TL can provide the touch sensing voltage generated from the touch driver TIC to the touch sensors TS provided in the touch block TB.

Figure 6:
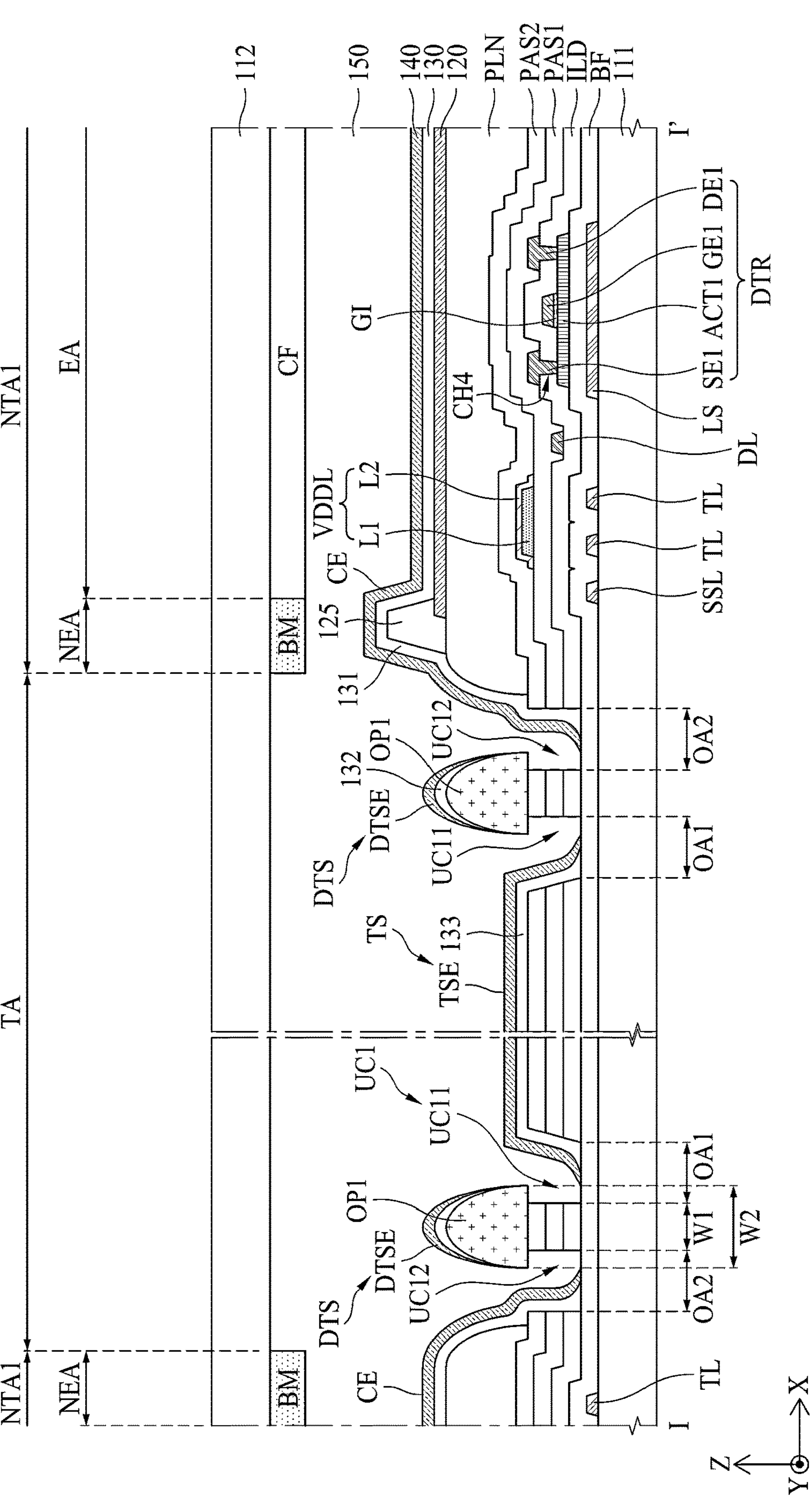
FIG. 6 is a cross-sectional view illustrating an example of line I-I' of FIG. 3.

Next, the light emitting elements of the light emission areas EA, and the touch sensors TS of the transmissive area TA will be described in more detail with reference to FIG. 6. In particular, FIG. 6 is a cross-sectional view illustrating an example of line I-I' of FIG. 3. Referring to FIGS. 3 and 6, the first substrate 111 can include transmissive areas TA and a non-transmissive area NTA including light emission area EA disposed between adjacent transmissive areas TA. The non-transmissive area NTA can include a first non-transmissive area NTA1 extending in the first direction (e.g., Y-axis direction) and a second non-transmissive area NTA2 extending in the second direction (e.g., X-axis direction).

The first non-transmissive area NTA1 includes circuit areas CA1-CA4 in which at least one transistor and a capacitor are disposed. In addition, the first non-transmissive area NTA1 can include a pixel power line VDDL, a common power line VSSL, a reference line RL, data lines DL, touch lines TL, sensing lines SSL extending in the first direction (e.g., Y-axis direction) and not overlapping the circuit areas CA1-CA4. The second non-transmissive area NTA2 can include a scan line SCANL and a touch bridge line TBL extending in the second direction (e.g., X-axis direction).

Further, the at least one transistor can include a driving transistor DTR and switching transistors. In particular, the switching transistor is switched in accordance with a scan signal supplied to the scan line SCANL to charge a data voltage supplied from the data line DL in the capacitor. In addition, the driving transistor DTR is switched in accordance with the data voltage charged in the capacitor to generate a data current from a power source supplied from the pixel power line VDDL and to supply the data current to a first electrode layer 120 of the subpixels SP1-SP4. The driving transistor DTR also includes an active layer ACT1, a gate electrode GE1, a source electrode SE1, and a drain electrode DE1.

In more detail, as shown in FIG. 6, a light shielding layer LS is formed on a first substrate 111. The light shielding layer LS shields external light incident on the active layer ACT1 in an area in which the driving transistor DTR is provided. The light shielding layer LS can include a single layer or multi-layer made of any one of molybdenum (Mo), aluminum (Al), chromium (Cr), gold (Au), titanium (Ti), nickel (Ni), neodymium (Nd) and copper (Cu), or their alloy.

Further, at least a portion of the pixel power line VDDL, the common power line VSSL, the reference line RL, the data lines DL, the touch lines TL, the touch bridge line TBL and the sensing line SSL can be formed in the same layer as the light shielding layer LS. For example, the reference line RL, the touch lines TL, the touch bridge line TBL and the sensing line SSL can include the same material as that of the light shielding layer LS in the same layer as the light shielding layer LS, but are not limited thereto.

A buffer layer BF is also provided over the light shielding layer LS and protects the transistors DTR from water permeated through the first substrate 111, which is vulnerable to water permeation, and can include an inorganic layer, for example, a silicon oxide layer (SiOx), a silicon nitride layer (SiNx) or a multi-layer of the silicon oxide layer and the silicon nitride layer.

An active layer ACT1 of the driving transistor DTR is also provided over the buffer layer BF. In particular, the active layer ACT1 can include a silicon-based semiconductor material or an oxide-based semiconductor material. For example, the active layer ACT1 can include Indium Gallium Zinc Oxide IGZO. The active layer ACT1 can also include a multi-layer such as a first layer formed of a silicon-based semiconductor material or an oxide-based semiconductor material, and a second layer formed of ITO or IZO. For example, the active layer ACT1 of the driving transistor DTR can include a first layer made of Indium Gallium Zinc Oxide IGZO and a second layer made of IZO.

In addition, a gate insulating layer GI is provided over the active layer ACT1 of the driving transistor DTR. In particular, the gate insulating layer GI can be provided in a pattern in the area where a gate electrode GE1 of the driving transistor DTR is disposed. The gate insulating layer GI can include an inorganic layer, for example, a silicon oxide layer (SiOx), a silicon nitride layer (SiNx) or a multi-layer of the silicon oxide layer and the silicon nitride layer.

Also, as shown in FIG. 6, the gate electrode GE1 of the driving transistor DTR is provided over the gate insulating layer GI. The gate electrode GE1 can include a single layer or multi-layer made of one of molybdenum (Mo), aluminum (Al), chromium (Cr), gold (Au), titanium (Ti), nickel (Ni), neodymium (Nd) and copper (Cu), or their alloy.

An interlayer insulating layer ILD is then provided over the gate electrode GE1 of the driving transistor DTR. The interlayer insulating layer ILD can be provided in the non-transmissive area NTA and the transmissive area TA. However, to form a first undercut structure UC1 in the transmissive area TA, the interlayer insulating layer ILD includes an opened area, which exposes the buffer layer BF, without being provided in at least a portion of the transmissive area TA.

As an example, one or a plurality of first undercut structures UC1 can be provided. For example, the interlayer insulating layer ILD can include one opened area OA1 to form one undercut UC11 by using the first undercut structure UC1. Alternatively, the interlayer insulating layer ILD can include two or more opened areas OA1 and OA2 to form at least two or more undercuts UC11 and UC12 by using the first undercut structure UC1.

In the following description, for convenience of description, as shown in FIG. 6, the interlayer insulating layer ILD can include a first opened area OA1 and a second opened area OA2 to form two undercuts UC11 and UC12, but the present disclosure is not limited thereto. The interlayer insulating layer ILD can also include an inorganic layer, for example, a silicon oxide layer (SiOx), a silicon nitride layer (SiNx) or their multi-layer.

In addition, a source electrode SE1 and a drain electrode DE1 of the driving transistor DTR are disposed over the interlayer insulating layer ILD. In more detail, the source electrode SE1 and the drain electrode DE1 are connected to the active layer ACT1 of the driving transistor DTR through a fourth contact hole CH4 passing through the interlayer insulating layer ILD. Also, the source electrode SE1 and the drain electrode DE1 can include a single layer or multi-layer made of any one of molybdenum (Mo), aluminum (Al), chromium (Cr), gold (Au), titanium (Ti), nickel (Ni), neodymium (Nd) and copper (Cu) or their alloy.

Further, at least a portion of the pixel power line VDDL, the common power line VSSL, the reference line RL, the data lines DL, the touch lines TL, the touch bridge line TBL and the sensing line SSL can be provided on the same layer as the source electrode SE1 and the drain electrode DE1 of the driving transistor DTR. For example, the data lines DL can include the same material on the same layer as the source electrode SE1 and the drain electrode DE1, but are not limited thereto.

In addition, as shown in FIG. 6, a first passivation layer PAS1 for insulating the driving transistor DTR is provided over the source electrode SE1 and the drain electrode DE1 of the driving transistor DTR. The first passivation layer PAS1 can be provided in the non-transmissive area NTA and the transmissive area TA. However, to form the first undercut structure UC1 in the transmissive area TA, the first passivation layer PAS1 can be provided with an opened area exposing the buffer layer BF, without being provided in at least a portion of the transmissive area TA.

In more detail, the first passivation layer PAS1 can be provided with a first opened area OA1 and a second opened area OA2, which expose the buffer layer BF without being provided in at least a portion of the transmissive area TA, to form two undercuts UC11 and UC12 by using the first undercut structure UC1 in the transmissive area TA. The first opened area OA1 of the first passivation layer PAS1 can at least partially overlap the first opened area OA1 of the interlayer insulating layer ILD, and the second opened area OA2 of the first passivation layer PAS1 can at least partially overlap the second opened area OA2 of the interlayer insulating layer ILD. The first passivation layer PAS1 can include an inorganic layer, for example, a silicon oxide layer (SiOx), a silicon nitride layer (SiNx) or their multi-layer.

In addition, a second passivation layer PAS2 is provided over the first passivation layer PAS1. The second passivation layer PAS2 can also be provided in the non-transmissive area NTA and the transmissive area TA. To form the first undercut structure UC1 in the transmissive area TA, the second passivation layer PAS2 also includes an opened area exposing the buffer layer BF, without being provided in at least a portion of the transmissive area TA.

In more detail, the second passivation layer PAS2 can be provided with a first opened area OA1 and a second opened area OA2, which expose the buffer layer BF, without being provided in at least a portion of the transmissive area TA, to form two undercuts UC11 and UC12 by using the first undercut structure UC1 in the transmissive area TA. The first opened area OA1 of the second passivation layer PAS2 can at least partially overlap the first opened area OA1 of the first passivation layer PAS1 and the first opened area OA1 of the interlayer insulating layer ILD, and the second opened area OA2 of the second passivation layer PAS2 can at least partially overlap the second opened area OA2 of the first passivation layer PAS1 and the second opened area OA2 of the interlayer insulating layer ILD. The second passivation layer PAS2 can include an inorganic layer, for example, a silicon oxide layer (SiOx), a silicon nitride layer (SiNx) or their multi-layer.

In addition, a separate metal layer can be provided between the first passivation layer PAS1 and the second passivation layer PAS2. At least a portion of the pixel power line VDDL, the common power line VSSL, the reference line RL, the data lines DL, the touch lines TL, the touch bridge line TBL and the sensing line SSL can also be formed in the metal layer.

For example, the pixel power line VDDL and the common power line VSSL can be provided between the first and second passivation layers PAS1 and PAS2. In this instance, each of the pixel power line VDDL and the common power line VSSL can be provided to overlap at least a portion of the touch lines TL. The pixel power line VDDL can be provided to at least partially overlap two touch lines TL disposed between circuit areas CA1-CA4 and the transmissive area TA disposed at a right side of the circuit areas CA1-CA4. In addition, the common power line VSSL can be provided to at least partially overlap two touch lines TL disposed between the circuit areas CA1-CA4 and the transmissive area TA disposed at a left side of the circuit areas CA1-CA4.

Further, the pixel power line VDDL and the common power line VSSL are provided to overlap the touch lines TL, whereby an occurrence of the parasitic capacitance can be blocked or minimized between the touch lines TL and elements of the light emitting element, for example, between a first electrode layer 120 and a cathode electrode CE. That is, the pixel power line VDDL and the common power line VSSL can serve as a shielding film for blocking parasitic capacitance that affects the touch lines TL.

Thus, the transparent display panel 110 according to one embodiment of the present disclosure improves a ratio of a touch signal to noise and reduces a ghost touch defect as parasitic capacitance affecting the touch lines TL is reduced. When a user's finger touches the transparent display panel 110 and then moves away from the transparent display panel 110, a temperature of an organic material of the transparent display panel 110 is increased due to the user's body temperature and thus a dielectric constant is changed, whereby the ghost touch defect can occur. Even though a touch is not generated, a value sensed from the touch sensor TS is higher than a reference value recognized as a touch due to a change in the dielectric constant of the organic material, whereby the ghost touch defect recognized as a touch can occur in the transparent display panel 110. Such a ghost touch defect can be less likely to occur by reducing a total amount of parasitic capacitance affecting the touch sensor TS or the touch lines TL. The transparent display panel 110 according to one embodiment of the present disclosure can improve a touch recognition rate as the parasitic capacitance affecting the touch lines TL is reduced.

In addition, the metal layer can include a single layer or multi-layer made of any one of molybdenum (Mo), aluminum (Al), chromium (Cr), gold (Au), titanium (Ti), nickel (Ni), neodymium (Nd), copper (Cu), ITO and IZO, or their alloy. For example, the metal layer can include an alloy of molybdenum (Mo) and titanium (Ti) or a stacked structure of an alloy of molybdenum (Mo) and titanium (Ti) and ITO or a stacked structure of an alloy of molybdenum (Mo) and titanium (Ti), copper (Cu) and ITO.

In one embodiment, each of the pixel power line VDDL and the common power line VSSL can include a double layer. Each of the pixel power line VDDL and the common power line VSSL can also include a first line L1 and a second line L2. The first line L1 can include a metal having resistance lower than that of the second line L2. For example, the first line L1 can include copper (Cu) having low resistance, but is not limited thereto. The first line L1 can also be thicker than the second line L2 to reduce total resistance.

Further, the second line L2 can be provided to cover an upper surface of the first line L1, thereby protecting the upper surface of the first line L1 and preventing the first line L1 from being corroded. The second line L2 can include a material having an oxidation degree lower than that of the first line L1. For example, the second line L2 can include ITO, but is not limited thereto.

As shown in FIG. 6, a planarization layer PLN for planarizing a step difference due to the driving transistor DTR and the signal lines is also provided over the second passivation layer PAS2. The planarization layer PLN can be provided in the non-transmissive area NTA, and may not be provided in at least a portion of the transmissive area TA. The planarization layer PLN can suppress a transparency by inducing refraction or the like of transmitted light. Therefore, the transparent display panel 110 according to one embodiment of the present disclosure can increase the transparency by removing a portion of the planarization layer PLN in the transmissive area TA. The planarization layer PLN can also include an organic layer such as acryl resin, epoxy resin, phenolic resin, polyamide resin, polyimide resin or the like.

Further, the first undercut structure UC1 can be formed using a first organic pattern OP1 and a plurality of inorganic insulating layers. In more detail, the first undercut structure UC1 can include a first organic pattern OP1 and a plurality of inorganic layers that include a first opened area OA1 and a second opened area OA2. The first organic pattern OP1 can be formed of the same material as that of the planarization layer PLN on the same layer as the planarization layer PLN. The first organic pattern OP1 can be spaced apart from the planarization layer PLN provided in the non-transmissive area NTA, but is not limited thereto. Also, the first organic pattern OP1 can be formed of a material different from that of the planarization layer PLN on a different from the planarization layer PLN. The inorganic layers can be first and second passivation layers PAS1 and PAS2 and the interlayer insulating layer ILD.

In addition, the first organic pattern OP1 can be provided over the inorganic layers provided between the first opened area OA1 and the second opened area OA2. The first opened area OA1 of the inorganic layers can have a closed shape on a plane along an edge area of the touch sensor TS. For example, the first opened area OA1 of the inorganic layers can have a rectangular shape on a plane, but is not limited thereto.

Further, the second opened area OA2 of the inorganic layers can be provided between the first opened area OA1 and the non-transmissive area NTA. The second opened area OA2 of the inorganic layers can be spaced apart from the first opened area OA1, and can have a closed shape on a plane along an outer edge of the first opened area OA1. For example, the second opened area OA2 of the inorganic layers can have a rectangular shape on a plane, but is not limited thereto.

Therefore, the inorganic layers provided between the first opened area OA1 and the second opened area OA2 can be separated from the inorganic layers, which are provided in an area overlapped with the touch sensor TS, with the first opened area OA1 interposed therebetween. In addition, the inorganic layers provided between the first opened area OA1 and the second opened area OA2 can be separated from the inorganic layers, which are provided in an area overlapped with the subpixels SP1-SP4, with the second opened area OA2 interposed therebetween.

Further, the first organic pattern OP1 can be provided over the inorganic layers between the first opened area OA1 and the second opened area OA2. The first organic pattern OP1 can be spaced apart from the inorganic layers provided in the area overlapped with the subpixels SP1-SP4 and the inorganic layers provided in the area overlapped with the touch sensor TS. In addition, the first organic pattern OP1 can be provided on the entire upper surface of a uppermost layer of the inorganic layers provided between the first opened area OA1 and the second opened area OA2. Also, the first organic pattern OP1 has a second width W2 on the upper surface of the uppermost layer of the inorganic layers provided between the first opened area OA1 and the second opened area OA2, and can be provided along an outer area of the touch sensor TS. The first organic pattern OP1 can be a ring pattern having a closed shape on a plane. For example, the first organic pattern OP1 can be a ring pattern having a rectangular shape on a plane.

The inorganic layers provided between the first opened area OA1 and the second opened area OA2 can also have a first width W1, and the first organic pattern OP1 can have a second width W2. In addition, the first undercut structure UC1 can be formed when the first organic pattern OP1 has the second width W2 greater than the first width W1 of the inorganic layers. The first undercut structure UC1 can include a first undercut UC11 provided in an area where the first organic pattern OP1 overlaps at least a portion of the first opened area OA1. In the first undercut structure UC1, the first organic pattern OP1 can protrude more than the inorganic layers, which are provided between the first opened area OA1 and the second opened area OA2, in the first opened area OA1 to form the first undercut UC11. In the first undercut UC11, the first organic pattern OP1 can protrude more toward the touch sensor TS than the inorganic layers provided between the first opened area OA1 and the second opened area OA2. Therefore, the first undercut structure UC1 can expose at least a portion of a lower surface of the first organic pattern OP1 in the first opened area OA1, and can form a space from the buffer layer BF without being provided with the inorganic layers below the exposed lower surface.

Also, the first undercut structure UC1 can include a second undercut UC12 formed in an area where the first organic pattern OP1 overlaps at least a portion of the second opened area OA2. In the first undercut structure UC1, the first organic pattern OP1 can protrude more than the inorganic layers, which are provided between the first opened area OA1 and the second opened area OA2, in the second opened area OA2 to form the second undercut UC12. In the second undercut UC12, the first organic pattern OP1 can protrude more toward the non-transmissive area NTA than the inorganic layers provided between the first opened area OA1 and the second opened area OA2. Therefore, the first undercut structure UC1 can expose at least a portion of the lower surface of the first organic pattern OP1 in the second opened area OA2, and can form a space from the buffer layer BF without being provided with the inorganic layers below the exposed lower surface.

Further, the first undercut structure UC1 can be provided in the transmissive area TA. In more detail, an undercut area UCA in which the first undercut structure UC1 is formed can be provided between the touch sensor TS and the non-transmissive area NTA. In addition, the undercut area UCA can have a closed shape on a plane. As an example, the undercut area UCA can be provided along the edge area of the transmissive area TA. In this instance, the undercut area UCA can be provided to surround the touch sensor TS. Also, the first undercut structure UC1 can be formed using the inorganic insulating layers and the first organic pattern OP1 made of a transparent material, whereby light transmittance can be prevented from being reduced due to the first undercut structure UC1.

A light emitting element, which includes a first electrode layer 120, an organic light emitting layer 130 and a second electrode layer 140, and a bank 125 is provided over the planarization layer PLN. The first electrode layer 120 is provided over the planarization layer PLN for each subpixel SP1-SP4. However, the first electrode layer 120 is not provided in the transmissive area TA. In addition, the first electrode layer 120 can be connected to the driving transistor DTR. In more detail, the first electrode layer 120 can be connected to one of the source electrode SE1 and the drain electrode DE1 of the driving transistor DTR through a contact hole passing through the planarization layer PLN and the first and second passivation layers PAS1 and PAS2.

The first electrode layer 120 can include a metal material having high reflectance, such as a stacked structure (Ti/Al/Ti) of aluminum and titanium, a stacked structure (ITO/Al/ITO) of aluminum and ITO, an Ag alloy, a stacked structure (ITO/Ag alloy/ITO) of Ag alloy and ITO, a MoTi alloy, and a stacked structure (ITO/MoTi alloy/ITO) of MoTi alloy and ITO. The Ag alloy can be an alloy of silver (Ag), palladium (Pd), copper (Cu), etc. The MoTi alloy can be an alloy of molybdenum (Mo) and titanium (Ti). The first electrode layer 120 can be an anode electrode.

In addition, the bank 125 is provided over the planarization layer PLN. The bank 125 can be provided to at least partially cover an edge of the first electrode layer 120 and expose a portion of the first electrode layer 120. Therefore, the bank 125 can prevent a problem in which light emitting efficiency is deteriorated due to the concentration of a current on an end of the first electrode layer 120.

Further, the bank 125 defines light emission areas EA1, EA2, EA3 and EA4 of the subpixels SP1-SP4. In particular, the light emission areas EA1, EA2, EA3 and EA4 of each of the subpixels SP1-SP4 represent an area in which the first electrode layer 120, the organic light emitting layer 130 and the cathode electrode CE are sequentially stacked and holes from the first electrode layer 120 and electrons from the cathode electrode CE are combined with each other in the organic light emitting layer 130 to emit light. In this instance, the area in which the bank 125 is provided can become the non-light emission area NEA because light is not emitted therefrom, and the area in which the bank 125 is not provided and the first electrode is exposed can become the light emission area EA. The bank 125 can also include an organic layer such as an acrylic resin, an epoxy resin, a phenolic resin, a polyamide resin, and a polyimide resin.

Further, the organic light emitting layer 130 is disposed over the first electrode layer 120. In more detail, the organic light emitting layer 130 can include a hole transporting layer, a light emitting layer and an electron transporting layer. In this instance, when a voltage is applied to the first electrode layer 120 and the cathode electrode CE, holes and electrons move to the light emitting layer through the hole transporting layer and the electron transporting layer, respectively and are combined with each other in the light emitting layer to emit light.

In one embodiment, the organic light emitting layer 130 can be a common layer commonly provided in the subpixels SP1-SP4. In this instance, the light emitting layer can be a white light emitting layer for emitting white light. In another embodiment, the light emitting layer of the organic light emitting layer 130 can be provided for each of the subpixels SP1-SP4. For example, a green light emitting layer for emitting green light can be provided in the first subpixel SP1, a red light emitting layer for emitting red light can be provided in the second subpixel SP2, a blue light emitting layer for emitting blue light can be provided in the third subpixel SP3, and a white light emitting layer for emitting white light can be provided in the fourth subpixel SP4. In this instance, the light emitting layer of the organic light emitting layer 130 is not provided in the transmissive area TA.

In addition, an organic light emitting layer 130 can be separated from the non-transmissive area NTA and the transmissive area TA by the first undercut structure UC1. In more detail, the organic light emitting layer 130 can be separated from an organic light emitting layer 131 provided in the non-transmissive area NTA and an organic light emitting layer 132 provided in the transmissive area TA by the first undercut structure UC1. That is, the organic light emitting layer 131 provided in the non-transmissive area NTA and the organic light emitting layer 132 provided in the transmissive area TA can be spaced apart from each other by the first undercut structure UC1.

Further, a second electrode layer 140 is disposed over the organic light emitting layer 130 and the bank 125. When the second electrode layer 140 is deposited on an entire surface, the second electrode layer 140 can be separated without being continuous between the non-transmissive area NTA and the transmissive area TA by the first undercut structure UC1. In more detail, the second electrode layer 140 can be separated into a second electrode CE provided in the non-transmissive area NTA, a second electrode DTSE provided on the first undercut structure UC1 and a second electrode TSE provided in the transmissive area TA by the first undercut structure UC1.

In this instance, the second electrode CE (hereinafter, referred to as 'cathode electrode') provided in the non-transmissive area NTA can be a cathode electrode, and is an element constituting a light emitting element. The cathode electrode CE can be connected to a cathode contact electrode CCT to receive a power source from the common power line VSSL. In addition, the cathode electrode CE can be a common layer that is commonly provided in the subpixels SP1-SP4 to apply the same voltage.

Also, a second electrode TSE (hereinafter, referred to as 'touch sensor electrode') provided in the transmissive area TA can be a touch sensor electrode, and can constitute the touch sensor TS. The touch sensor electrode TSE can be connected to a touch contact electrode TCT to provide a change in capacitance to the touch line TL. The touch sensor electrode TSE can also be connected to the touch line TL through the touch contact electrode TCT and a touch bridge line TBL. The elements for connecting the touch sensor electrode TSE with the touch line TL will be described later with reference to FIGS. 7 to 11.

In addition, a second electrode DTSE (hereinafter, referred to as 'dummy touch sensor electrode') provided on the first undercut structure UC1 can be a dummy touch sensor electrode, and can constitute a dummy touch sensor DTS. The dummy touch sensor electrode DTSE is not connected to the touch sensor TS, and does not serve as the touch sensor TS. Further, the dummy touch sensor electrode DTSE is provided between the touch sensor TS and the light emitting element so that the touch sensor electrode TSE of the touch sensor TS and the cathode electrode CE of the light emitting element can be more certainly separated from each other.

In addition, the second electrode layer 140, which includes the cathode electrode CE, the dummy touch sensor electrode DTSE and the touch sensor electrode TSE, can include a transparent conductive material (TCO) such as ITO and IZO that can transmit light, or a semi-transmissive conductive material such as magnesium (Mg), silver (Ag) or an alloy of magnesium (Mg) and silver (Ag). When the second electrode 140 includes a semi-transmissive conductive material, the light emitting efficiency can be increased by a micro cavity.

An encapsulation layer can then be provided over the light emitting elements and the touch sensors TS. In particular, the encapsulation layer can be provided over the cathode electrode CE and the touch sensor electrode TSE to at least partially cover the cathode electrode CE and the touch sensor electrode TSE. The encapsulation layer serves to prevent oxygen or water from being permeated into the organic light emitting layer 130, the cathode electrode CE and the touch sensor electrode TSE. Accordingly, in some embodiments, the encapsulation layer can include at least one inorganic layer and at least one organic layer.

In addition, a color filter CF is then provided over one surface of the second substrate 112 facing the first substrate 111. In this instance, the first substrate 111 provided with the encapsulation layer and the second substrate 112 provided with the color filter CF can be bonded to each other by a filler 150. In addition, the filler 150 can be an optically clear resin (OCR) layer or an optically clear adhesive (OCA) film.

Further, the color filter CF can be patterned for each subpixel SP1-SP4. A black matrix BM can also be provided between color filters CF. In particular, the black matrix BM can be disposed between the subpixels SP1-SP4 to prevent a color mixture from occurring between adjacent subpixels SP1-SP4. In addition, the black matrix BM can prevent light incident from the outside from being reflected by the plurality of lines, for example, the scan lines SCANL, the pixel power line VDDL, the common power line VSSL, the reference line RL, data lines DL, the sensing line SSL etc., provided between the subpixels SP1-SP4.

Further, the touch sensor electrode TSE of the touch sensor TS and the cathode electrode CE of the light emitting element can be provided in the same layer using the first undercut structure UC1. Thus, a touch process is simplified, and a separate mask for the touch sensor electrode TSE is not required. Therefore, the present disclosure optimizes the process and reduce production energy.

Further, the first undercut structure UC1 can be formed using the inorganic insulating layers and the first organic pattern OP1 made of a transparent material, whereby the light transmittance can be prevented from being reduced due to the first undercut structure UC1. Also, the undercuts UC11 and UC12 can be formed using the first undercut structure UC1, so that the touch sensor electrode TSE and the cathode electrode CE can be more certainly separated from each other. Therefore, the transparent display panel 110 according to one embodiment of the present disclosure can reduce a defect rate generated as the touch sensor electrode TSE and the cathode electrode CE are connected to each other.

Also, the touch lines TL can be disposed below the light emitting element, whereby the light emitting efficiency of the pixel P can be prevented from being deteriorated due to the touch lines TL. Further, the touch lines TL can be disposed so as not to overlap the circuit areas CA1-CA4, whereby an influence caused by the circuit element can be reduced or minimized and the uniformity of parasitic capacitance can be improved.

As described above, the touch sensor TS can be connected to the touch line TL through a touch connection portion TC. When a portion of the touch sensors TS included in one block is not connected to the touch line TL, an area of the corresponding block, in which touch sensing is possible, can be reduced as much as the number of touch sensors TS in which a connection defect occurs. A difference in the area of the touch sensor TS enabling touch sensing occurs between a plurality of blocks, whereby a deviation occurs in a parasitic capacitance to deteriorate the touch performance.

The transparent display panel 110 also includes a plurality of contact areas for electrically connecting the touch sensor electrode TSE of the touch sensor TS with the touch line TL, thereby ensuring a connection between the touch sensor TS and the touch line TL.

Further, as described above, the touch sensor electrode TSE and the cathode electrode CE are separated from each other by the first undercut structure UC1. However, particles can be accumulated in the first undercut structure UC1 during the manufacturing process, and the touch sensor electrode TSE and the cathode electrode CE of the light emitting element can be electrically connected to each other even though they are separated from each other.

Because all of the touch sensors TS included in one touch block TB are electrically connected to each other, even though a defect occurs in only one of the touch sensors TS, all of the touch sensors TS included in the corresponding touch block TB do not operate normally. Therefore, when the touch sensor electrode TSE and the cathode electrode CE are connected to each other to generate a defective touch sensor TS, a user's touch is not sensed in the touch block TB in which the defective touch sensor TS is included. A plurality of defective touch sensors TS can be generated, and the defective touch sensors TS can be disposed in different touch blocks TB. In this instance, the touch blocks TB with the defective touch sensors TS do not sense a touch, and as a result, a touch defect rate of the transparent display panel 110 is increased.

Therefore, the transparent display panel 110 according to one embodiment of the present disclosure can include an element capable of specifying an area in which a defective touch sensor TS among the touch sensors TS included in one touch block TB is included. In addition, the transparent display panel 110 can electrically separate the touch sensors TS in a specific area from the touch bridge line TBL through a repair process.

Figure 7:
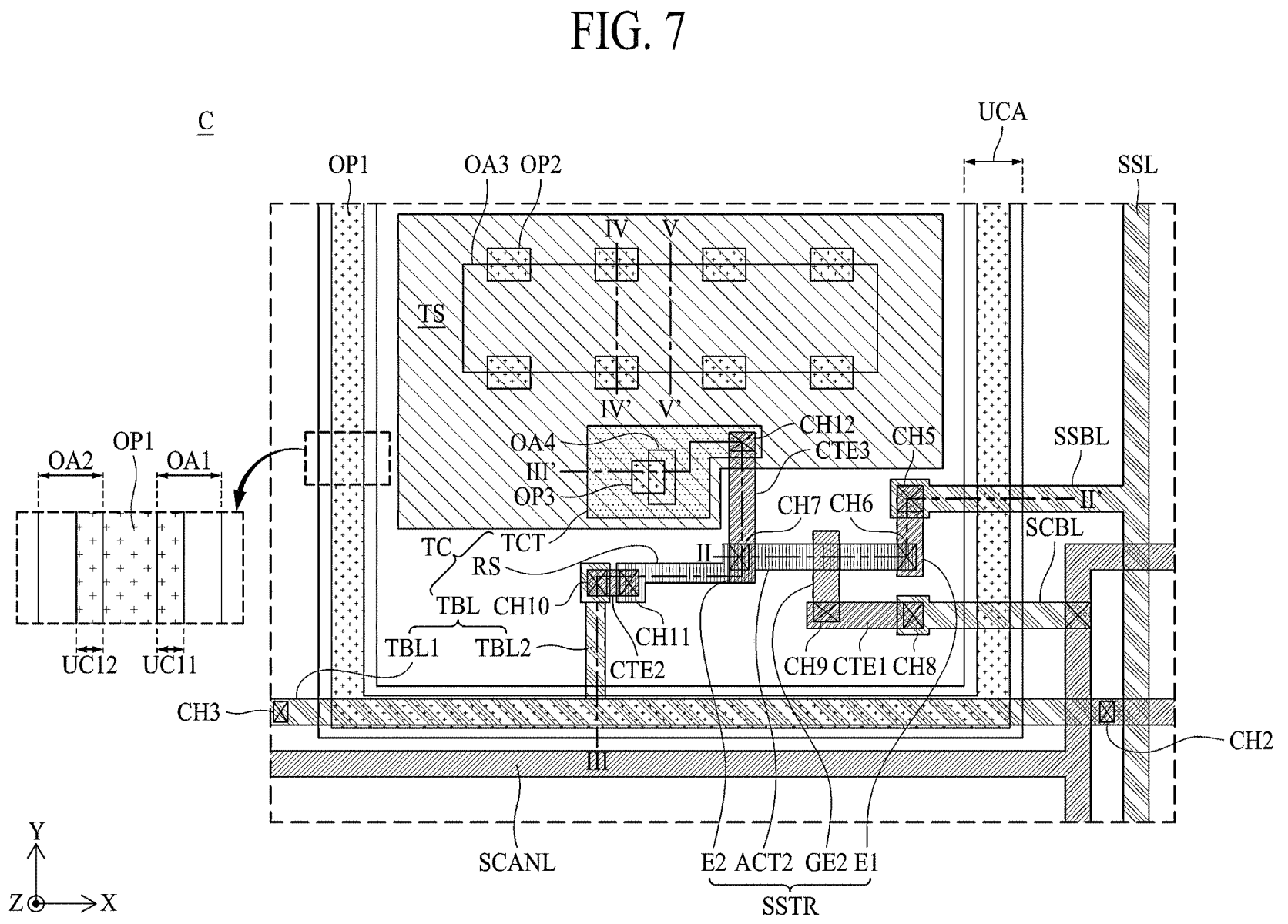
Figure 8:
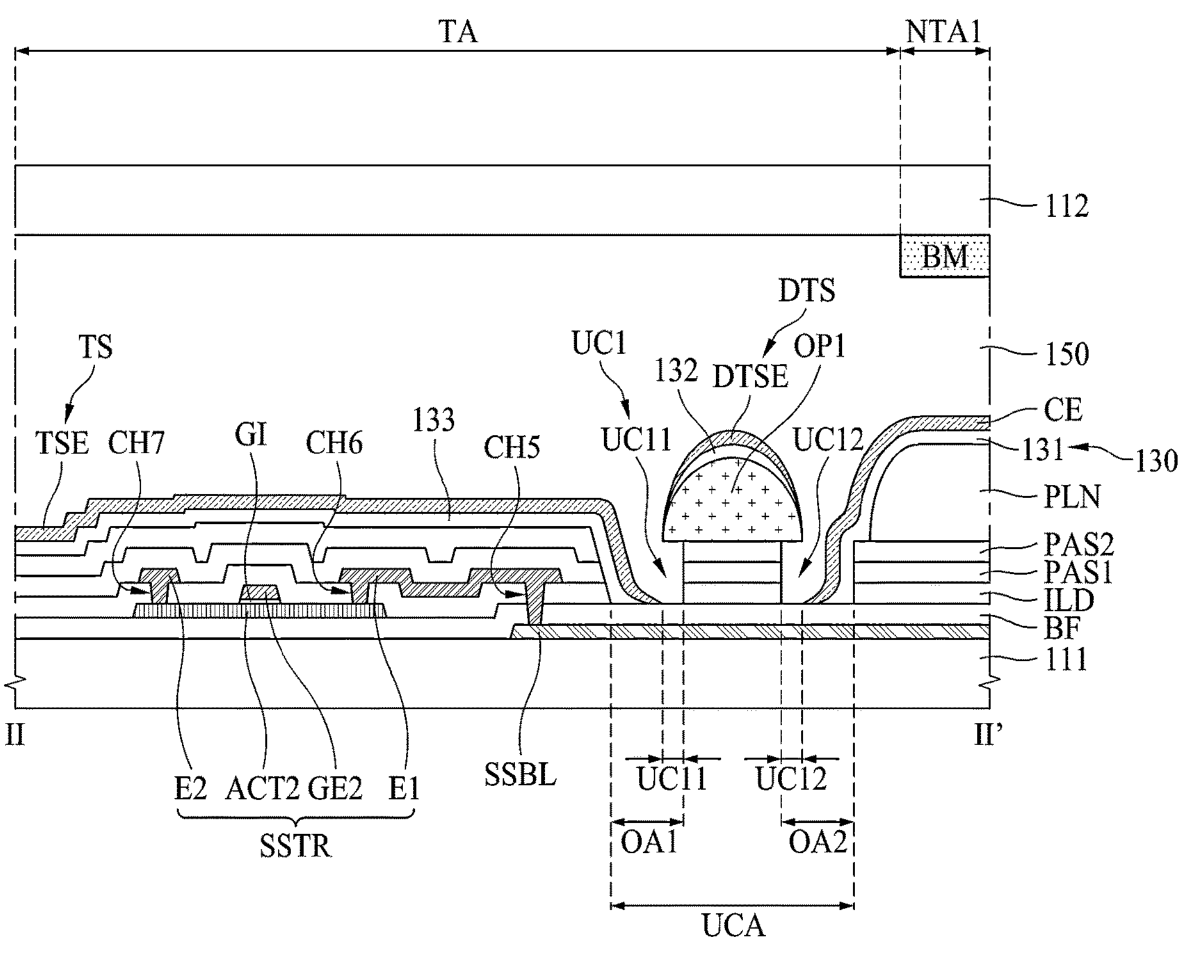
FIG. 8 is a cross-sectional view illustrating an example of line II-II' of FIG. 7.
Figure 9:
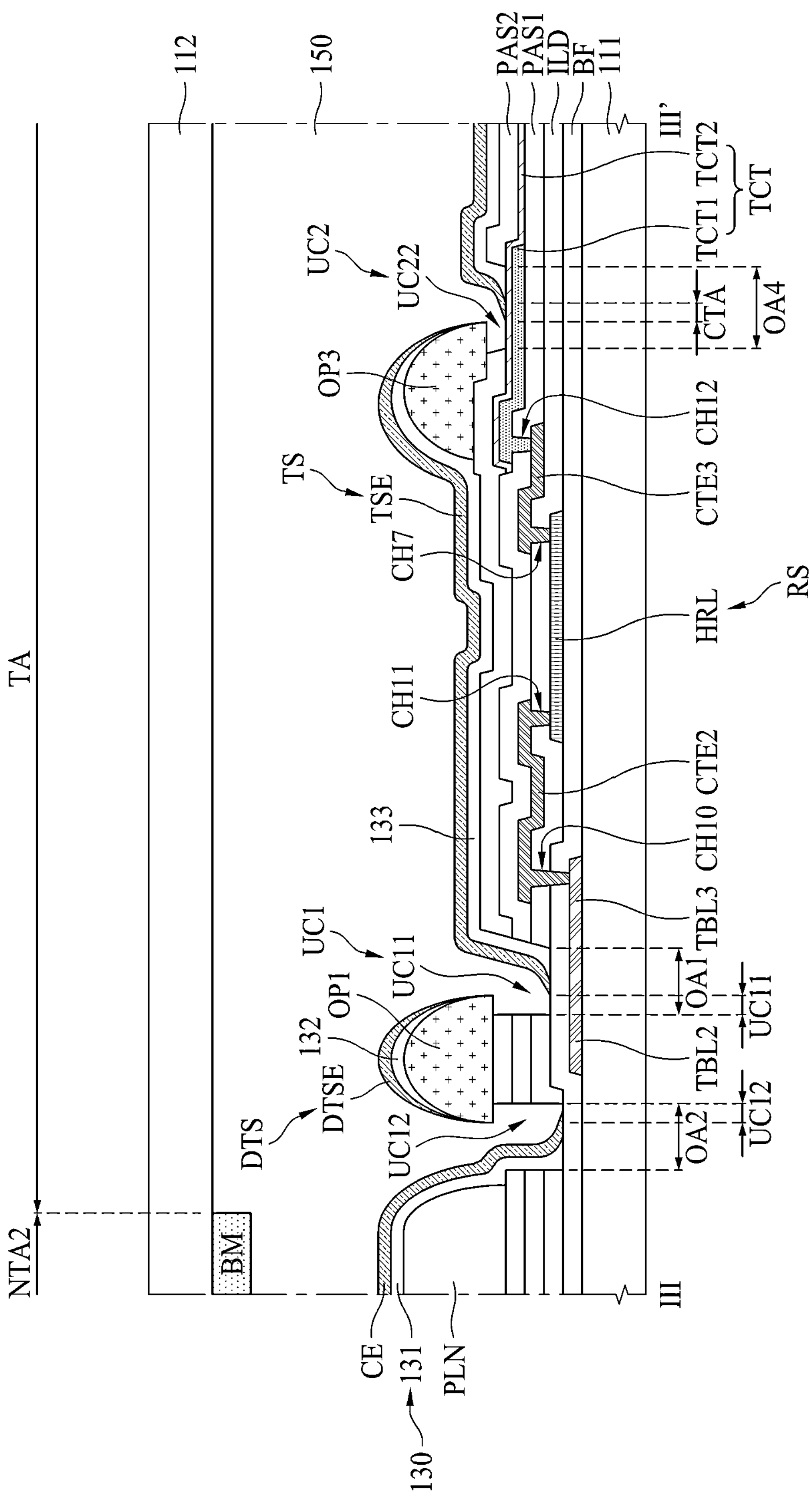
FIG. 9 is a cross-sectional view illustrating an example of line III-III' of FIG. 7.
Figure 10:
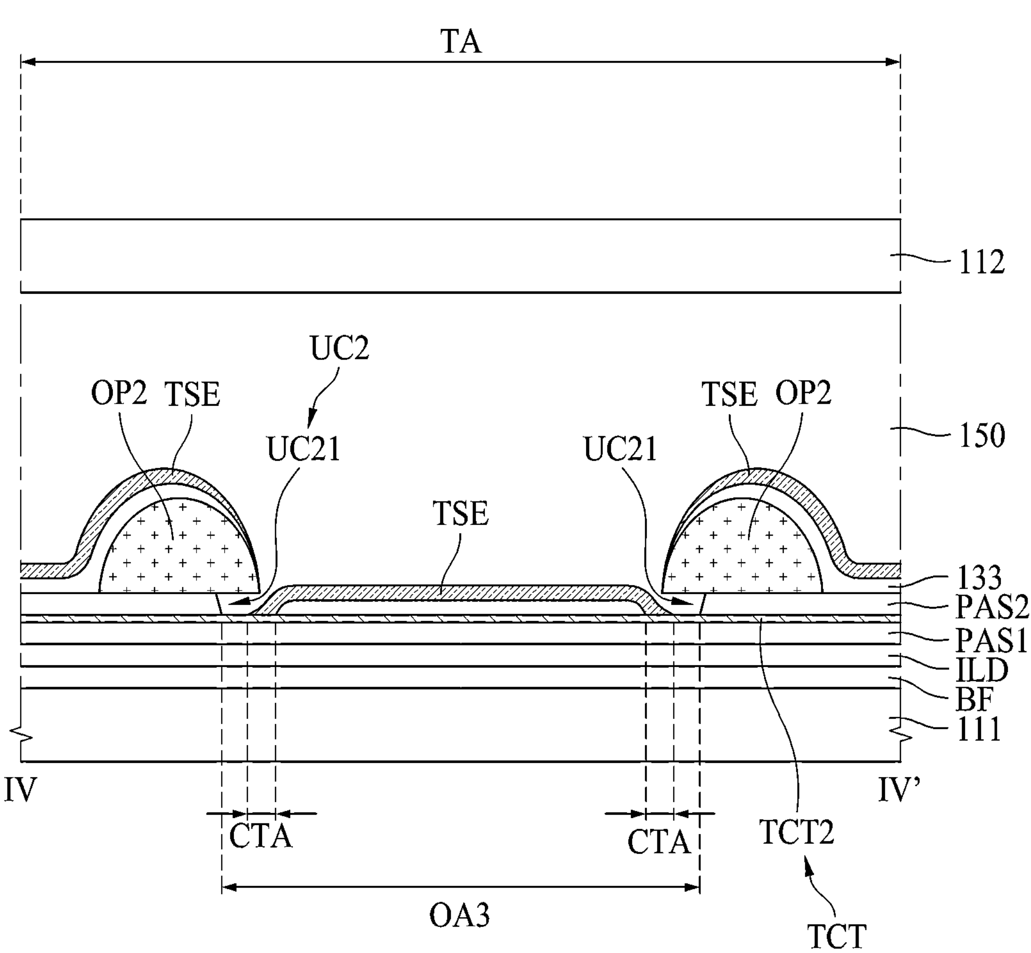
FIG. 10 is a cross-sectional view illustrating an example of line IV-IV' of FIG. 7.
Figure 11:
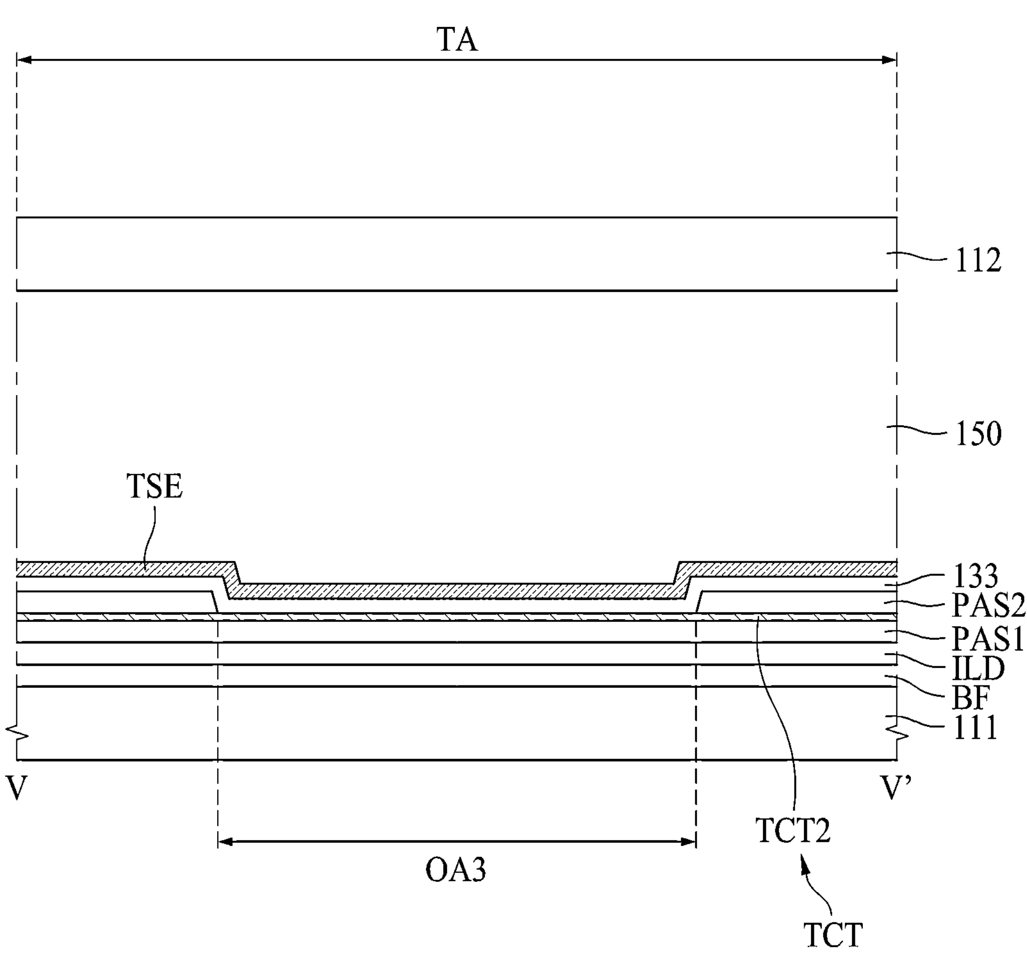
FIG. 11 is a cross-sectional view illustrating an example of line V-V' of FIG. 7.
Figure 12:
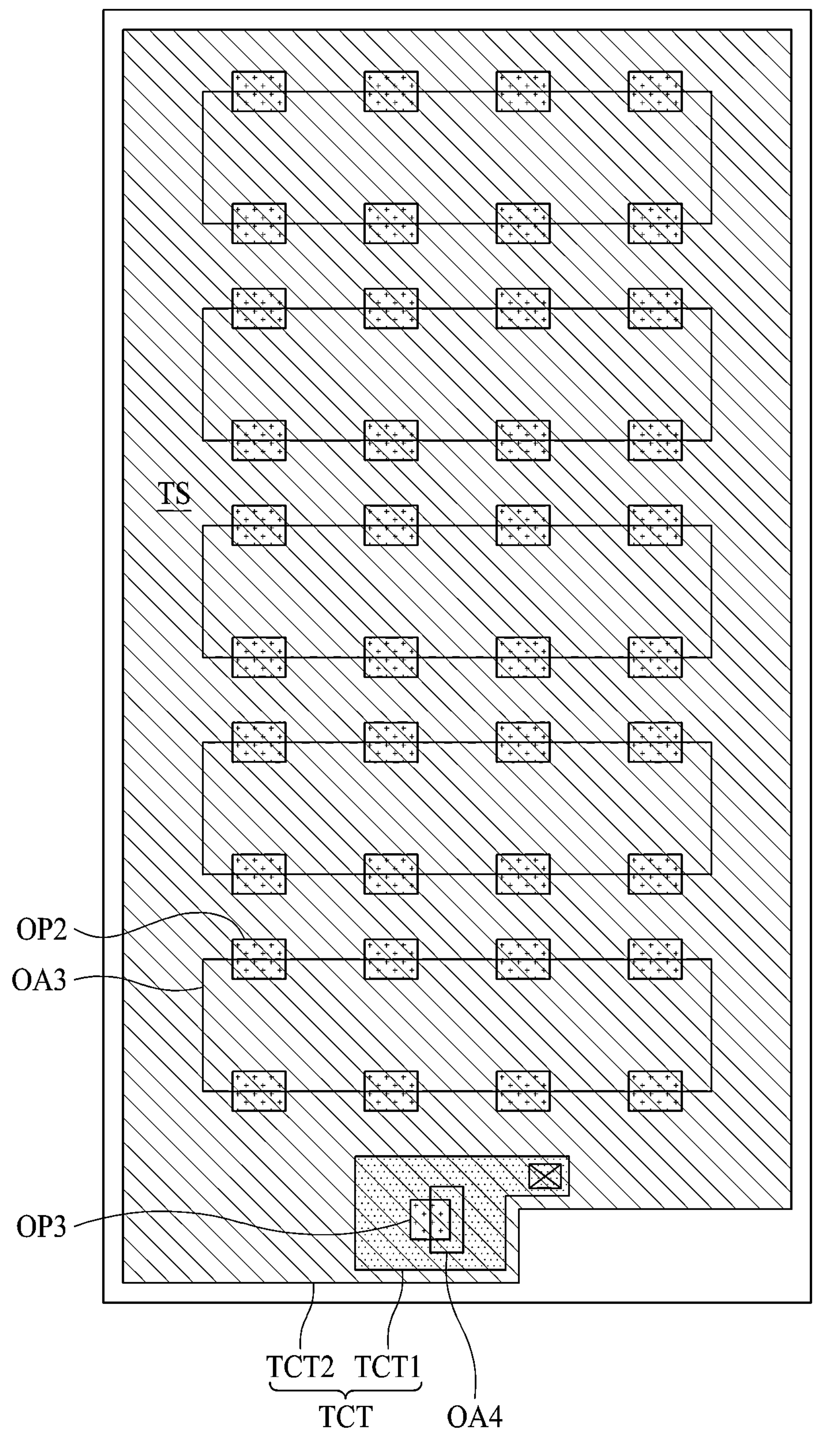
FIG. 12 is a cross-sectional view illustrating a modified embodiment of a touch contact electrode shown in FIG. 7.

Hereinafter, the element capable of specifying an area in which a touch connection portion TC including a plurality of contact areas and a defective touch sensor TS are included will be described in more detail with reference to FIGS. 3 and 7 to 11. In particular, FIG. 7 is a view illustrating an example of a sensing transistor and a touch connection portion, which are provided in an area C of FIG. 3, FIG. 8 is a cross-sectional view illustrating an example of line II-II' of FIG. 7, and FIG. 9 is a cross-sectional view illustrating an example of line III-III' of FIG. 7. Further, FIG. 10 is a cross-sectional view illustrating an example of line IV-IV' of FIG. 7, FIG. 11 is a cross-sectional view illustrating an example of line V-V' of FIG. 7, and FIG. 12 is a cross-sectional view illustrating a modified embodiment of a touch contact electrode shown in FIG. 7.

Referring to FIGS. 3 and 7-11, the transparent display panel 110 can further include a sensing transistor SSTR connecting the touch sensor TS with the sensing line SSL, and a touch connection portion TC connecting the touch sensor TS with the touch line TL. The sensing transistor SSTR is connected to the touch sensor TS and the sensing line SSL and transfers a voltage of the touch sensor TS to the sensing line SSL.

In more detail, as shown in FIGS. 3 and 7, the sensing transistor STR can be provided to at least partially overlap the touch sensor TS and is connected to the touch sensor TS and the sensing line SSL. The sensing transistor SSTR can also be spaced apart from the first undercut structure UC1. Further, the sensing transistor SSTR can be disposed to at least partially overlap the touch sensor electrode TSE separated by the first undercut structure UC1.

In addition, the sensing transistor SSTR can include an active layer ACT2, a gate electrode GE2, a first electrode E1 and a second electrode E2. Any one of the first electrode E1 and the second electrode E2 of the sensing transistor SSTR can be a source electrode, and the other one can be a drain electrode. The active layer ACT2, the gate electrode GE2, the first electrode E1 and the second electrode E2 of the sensing transistor SSTR are shown as being disposed to overlap the touch sensor TS, but the present disclosure is not limited thereto.

Further, the gate electrode GE2 of the sensing transistor SSTR can be electrically connected to the scan line SCANL. In more detail, the gate electrode GE2 of the sensing transistor SSTR can be connected to a scan bridge line SCBL electrically connected to the scan line SCANL. The scan line SCANL and the scan bridge line SCBL can be provided on layers different from each other. In addition, the scan bridge line SCBL can be electrically connected to the scan line SCANL at one end through a contact hole, and extend to an area overlapped with the touch sensor TS across the first undercut structure UC1. Also, the scan bridge line SCBL can be electrically connected to the gate electrode GE2 of the sensing transistor SSTR at the other end.

As shown in FIG. 7, the scan bridge line SCBL can be connected to the gate electrode GE2 of the sensing transistor SSTR through a first connection electrode CTE1. In addition, the first connection electrode CTE1 can be provided between the interlayer insulating layer ILD and the first passivation layer PAS1. The first connection electrode CTE1 can also be electrically connected to the scan bridge line SCBL at one end through an eighth contact hole CH8. Further, the first connection electrode CTE1 can be electrically connected to the gate electrode GE2 of the sensing transistor SSTR at the other end through a ninth contact hole CH9. In one embodiment, the first connection electrode CTE1 can be disposed on the same layer as the source electrode SE1 and the drain electrode DE1 of the driving transistor DTR, but the present disclosure is not limited thereto. In another embodiment, the scan bridge line SCBL can be directly connected to the gate electrode GE2 of the sensing transistor SSTR.

Also, the scan bridge line SCBL can be formed in a layer provided between the first substrate 111 and the driving transistor DTR. In one embodiment, the scan bridge line SCBL can be formed of the same material as that of a light-shielding layer LS on the same layer as the light-shielding layer LS. Because the scan bridge line SCBL extends to the sensing transistor SSTR overlapping the touch sensor TS in the scan line SCANL disposed in the non-transmissive area NTA, the scan bridge line SCBL has to cross the first undercut structure UC1. In addition, the first undercut structure UC1 can be formed through a wet etching process. Thus, the scan bridge line SCBL can be formed on the same layer as the light-shielding layer LS so that the scan bridge line SCBL is prevented from being removed during the wet etching process for forming the first undercut structure UC1.

Also, the active layer ACT2 of the sensing transistor SSTR can be provided to at least partially overlap the gate electrode GE2 below the gate electrode GE2. The active layer ACT2 can be connected to the first electrode E1 at one end through a sixth contact hole CH6, and can be connected to the second electrode E2 at the other end through a seventh contact hole CH7.

In addition, the first electrode E1 of the sensing transistor SSTR can be electrically connected to the sensing line SSL. In more detail, the first electrode E1 of the sensing transistor SSTR can be connected to the sensing bridge line SSBL electrically connected to the sensing line SSL. For example, the sensing bridge line SSBL can be electrically connected to the sensing line SSL at one end, and extend to an area overlapped with the touch sensor TS across the first undercut structure UC1. The sensing bridge line SSBL can also be formed on the same layer as the sensing line SSL and branched from the sensing line SSL. The sensing bridge line SSBL can be electrically connected to the first electrode E1 of the sensing transistor SSTR at the other end.

Further, the sensing bridge line SSBL can be formed in a layer provided between the first substrate 111 and the driving transistor DTR. In one embodiment, the sensing bridge line SSBL can be formed of the same material as that of the light-shielding layer LS on the same layer as the light-shielding layer LS. Because the sensing bridge line SSBL extends to the sensing transistor SSTR overlapping the touch sensor TS in the sensing line SSL disposed in the non-transmissive area NTA, the sensing bridge line SSBL has to cross the first undercut structure UC1. In addition, as described above, the first undercut structure UC1 can be formed through a wet etching process. Thus, the sensing bridge line SSBL can be formed on the same layer as the light-shielding layer LS so that the sensing bridge line SSBL is prevented from being removed during the wet etching process for forming the first undercut structure UC1.

Also, the first electrode E1 of the sensing transistor SSTR can be connected to the sensing bridge line SSBL at one end through a fifth contact hole CH5, and can be connected to the active layer ACT2 at the other end through a sixth contact hole CH6. The second electrode E2 of the sensing transistor SSTR can also be connected to the active layer ACT2 at one end through the seventh contact hole CH7, and can be connected to the touch contact electrode TCT at the other end through a twelfth contact hole CH12. Because the touch contact electrode TCT is electrically connected to the touch sensor TS, the second electrode E2 of the sensing transistor SSTR can be electrically connected to the touch sensor TS through the touch contact electrode TCT.

As described above, the gate electrode GE2 of the sensing transistor SSTR can be connected to the scan line SCANL, and the first electrode E1 of the sensing transistor SSTR can be connected to the sensing line SSL. Further, the second electrode E2 of the sensing transistor SSTR can be connected to the touch sensor electrode TSE of the touch sensor TS. Also, the sensing transistor SSTR can be turned on in response to a scan signal applied through the scan line SCANL. When the sensing transistor SSTR is turned on, a voltage of the touch sensor electrode TSE can be transferred to the sensing line SSL.

In addition, the touch connection portion TC connects the touch sensor TS with the touch line TL. The touch connection portion TC can include a touch bridge line TBL and a touch contact electrode TCT. In one embodiment, the touch connection portion TC can further include a resistance sensor RS that includes a high resistance area.

Further, the touch bridge line TBL can connect any one of the touch lines TL with the touch sensor TS. For example, the touch bridge line TBL can include a first touch bridge line TBL1, a second touch bridge line TBL2 and a third touch bridge line TBL3 as shown in FIG. 3. The first touch bridge line TBL1 can be disposed in an area where the first non-transmissive area NTA1 and the second non-transmissive area NTA2 cross each other, and extend in the second direction (e.g., X-axis direction). One end of the first touch bridge line TBL1 can be connected to one second touch bridge line TBL2 through one second contact hole CH2, and the other end of the first touch bridge line TBL1 can be connected to another second touch bridge line TBL2 through a third contact hole CH3. Also, the first touch bridge line TBL1 can be connected to one of the touch lines TL through a first contact hole CH1.

In addition, the first touch bridge line TBL1 can be disposed in a layer different from first signal lines SL1 extended in the first direction (e.g., Y-axis direction) in the first non-transmissive area NTA1. The first touch bridge line TBL1 can be disposed on the same layer as at least one of the light-shielding layer LS, the active layer ACT1, the gate electrode GE1, the source electrode SE1 or the drain electrode DE1 of the driving transistor DTR. For example, the first touch bridge line TBL1 can be disposed on the same layer as the gate electrode GE1 of the driving transistor DTR.

In one embodiment, the first touch bridge line TBL1 can include a first branch line BL1 and a second branch line BL2 as shown in FIG. 3. The first touch bridge line TBL1 can be branched to the first branch line BL1 and the second branch line BL2 at one side, and then the first branch line BL1 and the second branch line BL2 can be connected to each other at the other side.

Because the first touch bridge line TBL1 is disposed in an area crossing the first signal lines SL1, the first touch bridge line TBL1 can be disposed to be adjacent to at least one of the first signal lines SL1 in a vertical direction. For example, the first touch bridge line TBL1 can be disposed on the same layer as the gate electrode GE1 of the driving transistor DTR, and data lines DL can be disposed on the same layer as the source electrode SE1 and the drain electrode DE1 of the driving transistor DTR. When particles flow into the first touch bridge line TBL1 and the data lines DL, which are disposed to be adjacent to each other in the vertical direction, during the process, the first touch bridge line TBL1 and the data lines DL can be connected to each other to generate short-circuit. In this instance, because a touch signal cannot be applied to the touch sensors TS connected to the first touch bridge line TBL1, the touch sensors TS may not operate normally.

Further, the first touch bridge line TBL1 can include the first branch line BL1 and the second branch line BL2 to reduce a defect rate of the touch sensor TS. When any one of the first branch line BL1 and the second branch line BL2 is short-circuited with another signal line, the branch line in which short-circuit occurs can be cut by a laser. Therefore, the touch sensors TS can receive a signal from the touch line TL through the branch line in which no short-circuit occurs, whereby the touch sensors TS can operate normally.

In addition, the second touch bridge line TBL2 can be provided in the second non-transmissive area NTA2 disposed between the transmissive areas TA. The second touch bridge line TBL2 can also be electrically connected to the first touch bridge line TBL1 and then extend in the second direction (e.g., X-axis direction). In more detail, one end of the second touch bridge line TBL2 can be connected to one first touch bridge line TBL1 through one second contact hole CH2, and the other end of the second touch bridge line TBL2 can be connected to the other first touch bridge line TBL1 through a third contact hole CH3.

The second touch bridge line TBL2 can also be disposed on the same layer as at least one of the light-shielding layer LS, the active layer ACT1, the gate electrode GE1, the source electrode SE1 or the drain electrode DE1 of the driving transistor DTR. For example, the second touch bridge line TBL2 can be disposed on the same layer as the light-shielding layer LS.

The third touch bridge line TBL3 can be electrically connected the touch contact electrode TCT with the second touch bridge line TBL2. Also, the third touch bridge line TBL3 can protrude from one side of the second touch bridge line TBL2 and extended to an area overlapped with the touch sensor TS. The third touch bridge line TBL3 can also be electrically connected to the touch contact electrode TCT at one end.

When the resistance sensor RS is provided, the third touch bridge line TBL3 can connect the second touch bridge line TBL2 with the resistance sensor RS. In more detail, one end of the third touch bridge line TBL3 can be connected to the second touch bridge line TBL2, and the other end of the third touch bridge line TBL3 can be connected to the second connection electrode CTE2 through a tenth contact hole CH10. The third touch bridge line TBL3 can be connected to the resistance sensor RS through the second connection electrode CTE2, but is not limited thereto. The third touch connection line TBL3 can also be directly connected to the resistance sensor RS.

In addition, the third touch bridge line TBL3 can be formed in a layer provided between the first substrate 111 and the driving transistor DTR. In one embodiment, the third touch bridge line TBL3 can be formed of the same material as that of the light-shielding layer LS on the same layer as the light-shielding layer LS. The third touch bridge line TBL3 also extends to the resistance sensor RS disposed to at least partially overlap the touch sensor TS in the second touch bridge line TBL2 disposed in the second non-transmissive area NTA and thus crosses the first undercut structure UC1. The first undercut structure UC1 can be formed through a wet etching process. Further, the third touch bridge line TBL3 can be formed on the same layer as the light-shielding layer LS so that the third touch bridge line TBL3 can be prevented from being lost during the wet etching process for forming the first undercut structure UC1.

In addition, the third touch bridge line TBL3 can be formed on the same layer as the second touch bridge line TBL2, but is not limited thereto. The third touch bridge line TBL3 can be formed in a layer different from the second touch bridge line TBL2. However, it may be preferable that the third touch bridge line TBL3 is formed in a layer provided between the first substrate 111 and the driving transistor DTR.

Further, the second connection electrode CTE2 electrically connects the third touch bridge line TBL3 with the resistance sensor RS. In particular, the second connection electrode CTE2 can be connected to the third touch bridge line TBL3 at one end through a tenth contact hole CH10, and can be connected to the resistance sensor RS at the other end through an eleventh contact hole CH11. In one embodiment, the second connection electrode CTE2 can be disposed on the same layer as the source electrode SE1 and the drain electrode DE1 of the driving transistor DTR.

In addition, the resistance sensor RS is disposed between the third touch bridge line TBL3 and the touch contact electrode TCT, and can include a high resistance line HRL as shown in FIG. 3. One end of the high resistance line HRL can be connected to the second connection electrode CTE2 through the eleventh contact hole CH11, and the other end of the high resistance line HRL can be connected to the third connection electrode CTE3 through the seventh contact hole CH7. Although FIG. 9 illustrates that the high resistance line HRL is connected to the third touch bridge line TBL3 through the second connection electrode CTE2, the present disclosure is not limited thereto. In another embodiment, the high resistance line HRL can be directly connected with the third touch bridge line TBL3.

Also, the high resistance line HRL can include a silicon-based semiconductor material or an oxide-based semiconductor material to implement high resistance. For example, the high resistance line HRL can be made of the same material on the same layer as the active layer ACT1 of the driving transistor DTR.

Further, the third connection electrode CTE3 electrically connects the resistance sensor RS with the touch contact electrode TCT. One end of the third connection electrode CTE3 can be connected to the high resistance line HRL through the eleventh contact hole CH11, and the other end of the third connection electrode CTE3 can be connected to the touch contact electrode TCT through the twelfth contact hole CH12. The third connection electrode CTE3 can also be the same element as the second electrode E2 of the sensing transistor STR, but is not limited thereto. In another embodiment, the third connection electrode CTE3 can be spaced apart from the second electrode E2 of the sensing transistor SSTR as a separate element. In still another embodiment, the third connection electrode CTE3 can be disposed on the same layer as the source electrode SE1 and the drain electrode DE1 of the driving transistor DTR.

In addition, the touch contact electrode TCT can be provided in the transmissive area TA. The touch contact electrode TCT electrically connects the touch bridge line TBL with the touch sensor electrode TSE. Further, the touch contact electrode TCT can be connected to the third touch bridge line TBL3 through the high resistance line HRL.

In addition, at least a portion of an upper surface of the touch contact electrode TCT can be exposed by the second undercut structure UC2, and the touch sensor electrode TSE can be connected to the exposed upper surface. In more detail, the touch contact electrode TCT can be formed on a layer provided between the buffer layer BF and the second passivation layer PAS2.

In one embodiment, the touch contact electrode TCT can be provided between the first passivation layer PAS1 and the second passivation layer PAS2. The touch contact electrode TCT can also be provided on the same layer as the pixel power line VDDL and the common power line VSSL.

In addition, the touch contact electrode TCT can be formed as a double layer such as the pixel power line VDDL and the common power line VSSL. The touch contact electrode TCT can also include a first touch contact electrode TCT1 and a second touch contact electrode TCT2.

As shown in FIG. 9, the first touch contact electrode TCT1 can be provided in an area overlapped with the touch sensor TS, and can be connected to the third connection electrode CTE3 through the twelfth contact hole CH12. The first touch contact electrode TCT1 can also be electrically connected to the touch bridge line TBL through the third connection electrode CTE3, the high resistance line HRL and the second connection electrode CTE2. In addition, the first touch contact electrode TCT1 can include a metal having resistance lower than that of the second touch contact electrode TCT2. For example, the first touch contact electrode TCT1 can include copper (Cu) having a low resistance, but is not limited thereto. The first touch contact electrode TCT1 can also be thicker than the second touch contact electrode TCT2 in order to reduce total resistance.

Further, the second touch contact electrode TCT2 can be provided on the first touch contact electrode TCT1. As shown in FIG. 9, the second touch contact electrode TCT2 can also be formed to at least partially cover the upper surface of the first touch contact electrode TCT1, thereby protecting the upper surface of the first touch contact electrode TCT1 and preventing the first touch contact electrode TCT1 from being corroded. The second touch contact electrode TCT2 can also include a material having an oxidation degree lower than that of the first touch contact electrode TCT1. For example, the second touch contact electrode TCT2 can include ITO, but is not limited thereto.

In addition, the second touch contact electrode TCT2 can have at least a portion of an upper surface exposed by the second undercut structure UC2, and the touch sensor electrode TSE can be connected to the exposed upper surface. The second touch contact electrode TCT2 can have a wide area to contact the touch sensor electrode TSE in a plurality of areas. Further, the second touch contact electrode TCT2 can be provided to overlap all of the second undercut structures UC2. Although FIG. 7 illustrates that only eight second undercut structures UC2 are provided, the present disclosure is not limited thereto.

In a modified embodiment, as shown in FIG. 12, the second undercut structures UC2 can be provided to be larger than 8 in an area except for an area of the touch sensor TS, in which the sensing transistor SSTR is formed. In this instance, the second touch contact electrode TCT2 can be provided to overlap the area except for the area of the touch sensor TS, in which the sensing transistor SSTR is formed. Because the first touch contact electrode TCT1 has only to be in contact with the second touch contact electrode TCT2 without being directly in contact with the touch sensor electrode TSE, the first touch contact electrode TCT1 can be formed to have a relatively small area. The first touch contact electrode TCT1 also has transparency lower than that of the second touch contact electrode TCT2 and has a minimum area, whereby loss of a transmissive rate in the transmissive area TA can be minimized.

Further, the second undercut structure UC2 can be formed using the second organic patterns OP2 and the second passivation layer PAS2. In more detail, the second undercut structure UC2 can include a plurality of second organic patterns OP2 and a second passivation layer PAS2 that includes a third opened area OA3. As shown in FIGS. 10 and 11, the second passivation layer PAS2 can be provided with the third opened area OA3 that exposes at least a portion of an upper surface of the second touch contact electrode TCT2. The third opened area OA3 of the second passivation layer PAS2 can be provided in the transmissive area TA, and in more detail, can be provided in an area overlapped with the touch sensor TS. The third opened area OA3 of the second passivation layer PAS2 can also be provided with a wide area such that at least a portion of the third opened area OA3 overlaps each of the second organic patterns OP2.

Further, the second organic patterns OP2 can be provided on the second passivation layer PAS2 provided in an area overlapped with the touch sensor TS. The second organic patterns OP2 can also be formed of the same material as that of the planarization layer PLN on the same layer as the planarization layer PLN, but is not limited thereto. The second organic patterns OP2 can include a material different from that of the planarization layer PLN on a layer different from the planarization layer PLN.

In addition, the second organic patterns OP2 can be spaced apart from the planarization layer PLN provided in an area overlapped with the subpixels SP1-SP4, and can be also spaced apart from the first organic pattern OP1. The second organic patterns OP2 can be a plurality of island patterns spaced apart from each other.

As shown in FIG. 7, the second organic patterns OP2 are spaced apart from each other along the edge of the third opened area OA3 of the second passivation layer PAS2. Although FIG. 7 illustrates that eight second organic patterns OP2 are provided, the present disclosure is not limited thereto. For example, the second organic patterns OP2 can be formed to be more than 8 along the edge of the third opened area OA3 of the second passivation layer PAS2, or can be formed to be less than 8. Further, in a modified embodiment, the second passivation layer PAS2 can be provided so that a plurality of third opened areas OA3 can be spaced apart from each other as shown in FIG. 12. In this instance, the second organic patterns OP2 can be spaced apart from each other along the edge in each of the third opened areas OA3.

Each of the second organic patterns OP2 can at least partially overlap the third opened area OA3 of the second passivation layer PAS2. The second undercut structure UC2 can include a first undercut UC21 formed in an area where the second organic pattern OP2 overlaps at least a portion of the third opened area OA3. As shown in FIG. 10, in the second undercut structure UC2, the second organic pattern OP2 can protrude more than the second passivation layer PAS2 in the third opened area OA3 to form the first undercut UC21. Therefore, the second undercut structure UC2 can expose at least a portion of a lower surface of the second organic pattern OP2 in the third opened area OA3, and can expose at least a portion of the upper surface of the second touch contact electrode TCT2 without being provided with the second passivation layer PAS2 below the exposed lower surface.

Because the second undercut structure UC2 is provided with the second organic patterns OP2, a plurality of first undercuts UC21 can be formed in the second undercut structure UC2. Therefore, the upper surface of the second touch contact electrode TCT2 can expose a plurality of areas below the lower surface of each of the second organic patterns OP2.

Further, the touch sensor electrode TSE can be disconnected without being continuous by the first undercut UC21. That is, the touch sensor electrode TSE provided over the second organic pattern OP2 is not connected to the touch sensor electrode TSE provided in the third opened area OA3. When two first undercuts UC21 face each other as shown in FIG. 10, the touch sensor electrode TSE provided on one second organic pattern OP2, the touch sensor electrode TSE provided on the other second organic pattern OP2 and the touch sensor electrode TSE provided in the third opened area OA3 are spaced apart from one another.

However, as shown in FIG. 11, the touch sensor electrode TSE provided between the second organic patterns OP2 can be electrically connected to the touch sensor electrode TSE provided in the third opened area OA3. Therefore, the touch sensor electrode TSE provided on one second organic pattern OP2, the touch sensor electrode TSE provided on the other second organic pattern OP2 and the touch sensor electrode TSE provided in the third opened area OA3 can be electrically connected to one another to operate as one touch sensor TS.

In addition, the touch sensor electrode TSE can be deposited on the upper surface of the second touch contact electrode TCT2 exposed by the first undercut UC21 to form a contact area CTA, and can be electrically connected to the touch contact electrode TCT. The second touch contact electrode TCT2 is provided with the contact area CTA contacting the touch sensor electrode TSE below the lower surface of each of the second organic patterns OP2. As a result, the second touch contact electrode TCT2 can include a plurality of contact areas CTAs.

In one embodiment, the second undercut structure UC2 can further include a third organic pattern OP3 and the second passivation layer PAS2 in which a fourth opened area OA4 is provided. As shown in FIG. 9, the fourth opened area OA4 can be further formed to expose at least a portion of the upper surface of the second touch contact electrode TCT2 provided in an area overlapped with the first touch contact electrode TCT1. The fourth opened area OA4 of the second passivation layer PAS2 is provided in the transmissive area TA, and in more detail, can be provided in an area overlapped with the touch sensor TS. Also, the fourth opened area OA4 of the second passivation layer PAS2 can have a small area so that at least a portion of the first touch contact electrode TCT1 can overlap the fourth opened area OA4.

Further, the third organic pattern OP3 can be provided over the second passivation layer PAS2 provided in an area overlapped with the touch sensor TS. The third organic pattern OP3 can also be formed of the same material as that of the planarization layer PLN on the same layer as the planarization layer PLN, but is not limited thereto. The third organic pattern OP3 can include a material different from that of the planarization layer PLN on a layer different from the planarization layer PLN.

In addition, the third organic pattern OP3 can be spaced apart from the planarization layer PLN provided in an area overlapped with the subpixels SP1-SP4. The third organic pattern OP3 can also be spaced apart from the first organic pattern OP1 and the second organic patterns OP2. The third organic pattern OP3 can be an island pattern.

In addition, the third organic pattern OP3 can at least partially overlap the fourth opened area OA4 of the second passivation layer PAS2. The second undercut structure UC2 can include a second undercut UC22 provided in an area where the third organic pattern OP3 overlaps at least a portion of the fourth opened area OA4. As shown in FIG. 9, in the second undercut structure UC2, the third organic pattern OP3 can protrude more than the second passivation layer PAS2 in the fourth opened area OA4 to form the second undercut UC22. Therefore, the second undercut structure UC2 can expose at least a portion of a lower surface of the third organic pattern OP3 in the fourth opened area OA4. Further, the second undercut structure UC2 can expose at least a portion of the upper surface of the second touch contact electrode TCT2 without being provided with the second passivation layer PAS2 below the exposed lower surface. Also, the touch sensor electrode TSE can be deposited on the upper surface of the second touch contact electrode TCT2 exposed from the second undercut U22 to form the contact area CTA.

Further, the second touch contact electrode TCT2 can be connected to the first touch contact electrode TCT1, and the first touch contact electrode TCT1 can be electrically connected to the touch line TL through the high resistance line HRL and the touch bridge line TBL. The touch contact electrode TCT including the first and second touch contact electrodes TCT1 and TCT2 can transfer a change in capacitance of the touch sensor electrode TSE to the touch line TL. In addition, the touch contact electrode TCT can transmit the voltage of the touch sensor electrode TSE to the sensing line SSL through the sensing transistor SSTR.

Also, the transparent display panel 110 according to one embodiment of the present disclosure can include a plurality of contact areas CTA in which the touch sensor electrode TSE and the touch contact electrode TCT contact each other by using the second undercut structure UC2. Further, when the touch sensor electrode TSE and the touch contact electrode TCT contact each other in at least one of the contact areas CTA, the touch sensor TS and the touch line TL can be electrically connected to each other. Therefore, a contact defect rate between the touch sensor electrode TSE and the touch contact electrode TCT can be significantly reduced. Further, there is no difference in the area of the touch sensor TS, in which touch sensing is possible, between the blocks. A deviation in parasitic capacitance can also be reduced, and touch performance can be improved.

Also, the second touch contact electrode TCT2 made of a transparent material can be formed with a wide area to overlap the second organic patterns OP2, whereby a loss of a transmissive rate in the transmissive area TA can be minimized. Further, the touch sensor electrode TSE can be deposited on the second organic patterns OP2. Therefore, as a surface area of the touch sensor electrode TSE is increased, the capacitance generated between a finger and the touch sensor TS even in case of the finger's touch is increased. Also, as a distance between the touch sensor TS and the finger is reduced even in case of the finger's touch, capacitance generated between the finger and the touch sensor TS can be increased. As a result, the touch performance can be improved.

Also, a defective touch sensor TS can be detected using the sensing transistor SSTR and the resistance sensor RS. In more detail, as described above, particles can be generated in the first undercut structure UC1, and the touch sensor electrode TSE and the cathode electrode CE can be electrically connected to each other without being separated from each other. When a different voltage is applied to each of the touch line TL and the common power line VSSL, a current flows from the touch sensor electrode TSE to the cathode electrode CE in the defective touch sensor TS.

For example, a first voltage, e.g., 20V can be applied to the touch line TL, and a second voltage, e.g., 0V can be applied to the common power line VSSL. Because the touch sensor electrode TSE and the cathode electrode CE of the light emitting element are electrically connected to each other, a current path can be generated from the touch sensor electrode TSE of the defective touch sensor TS to the cathode electrode CE. When the resistance sensor RS is provided on the current path, a voltage of the defective touch sensor TS is reduced by the high resistance of the resistance sensor RS. On the other hand, since the current does not flow to the touch sensor electrode TSE, the voltage applied from the touch line TL can be maintained.

Further, the sensing transistor SSTR connected to the touch sensor TS can be turned on in accordance with the scan signal applied through the scan line SCANL. When the sensing transistor SSTR is turned on, a voltage of the touch sensor electrode TSE can be applied to the sensing line SSL. When the touch sensor TS is a normal touch sensor, the voltage of the touch sensor TS can be the same as or similar to the first voltage applied to the touch line TL, for example, 20V. On the other hand, when the touch sensor TS is the defective touch sensor TS, because the voltage of the defective touch sensor TS is reduced by the high resistance of the resistance sensor RS, the voltage of the touch sensor TS can have a value which is significantly reduced than the first voltage applied to the touch line TL, for example, 20V.

As described above, the defective touch sensor can be detected using the sensing transistor SSTR and a high resistance area. When the defective touch sensor TS is detected, the touch sensor TS can be separated from the touch line TL in the transparent display panel 110 by laser cutting the touch connection portion TC connected to the detected touch sensor TS, particularly, the second touch bridge line TBL2. Therefore, the remaining touch sensors TS of the corresponding touch block TB can operate normally.

Further, the defective touch sensor TS can be exactly detected within one touch block TB. Therefore, the transparent display panel 110 according to one embodiment of the present disclosure can reduce a touch defect rate and improve a touch recognition rate.

Further, the pixel power line VDDL and the common power line VSSL can be provided to overlap the touch lines TL, whereby the parasitic capacitance affecting the touch lines TL can be blocked. However, because the pixel power line VDDL and the common power line VSSL do not overlap the touch bridge line TBL connected to one of the touch lines TL, the parasitic capacitance affecting the touch bridge line TBL cannot be blocked, but the present disclosure is not limited thereto.

In another embodiment, the pixel power line VDDL and the common power line VSSL can overlap at least a portion of the touch bridge line TBL. Hereinafter, an embodiment in which the pixel power line VDDL and the common power line VSSL overlap at least a portion of the touch bridge line TBL will be described with reference to FIGS. 13 to 17.

Figure 13:
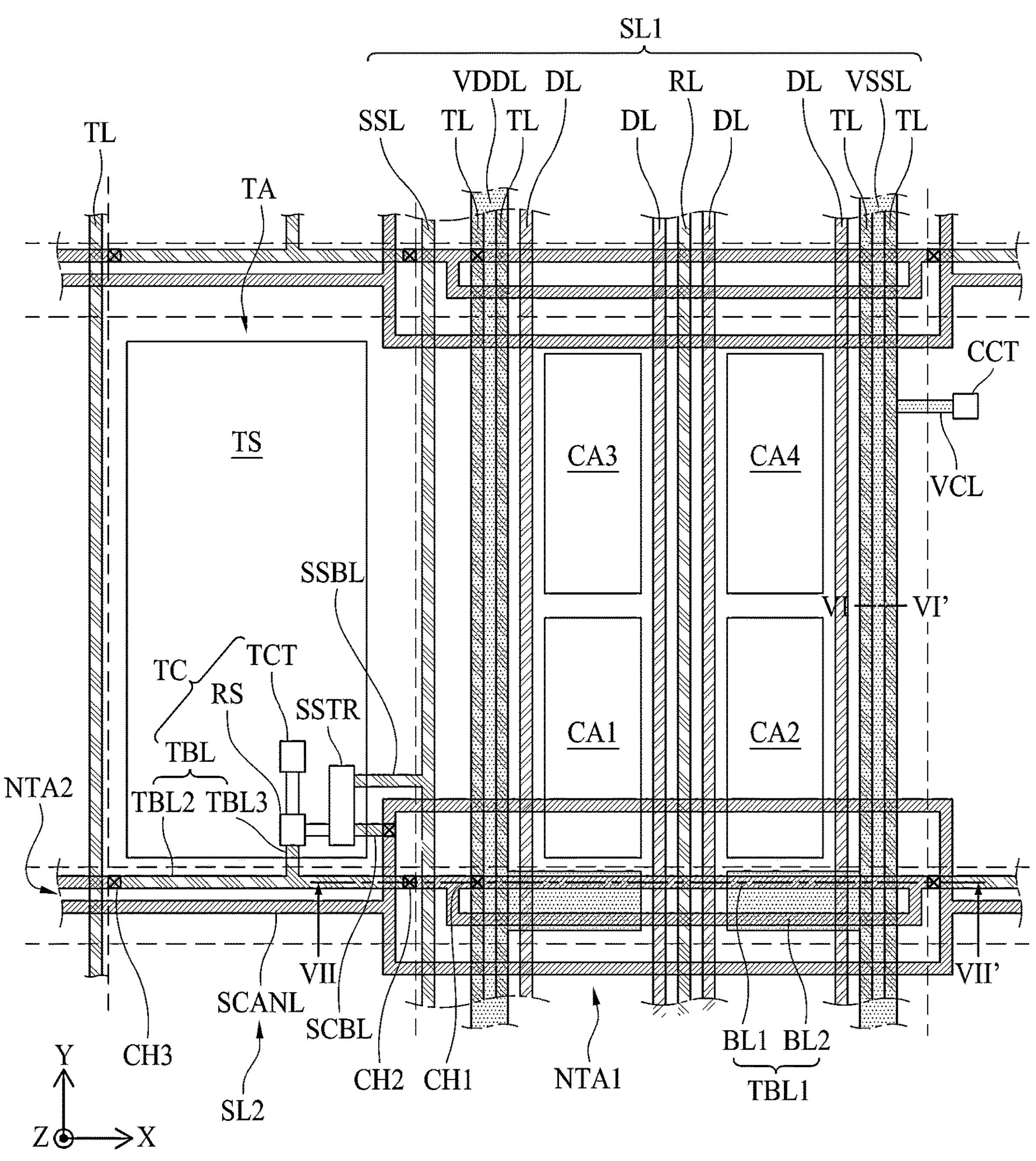
FIG. 13 is a view illustrating another example of signal lines, touch lines and a touch sensor, which are provided in an area B of FIG. 2.
Figure 14:
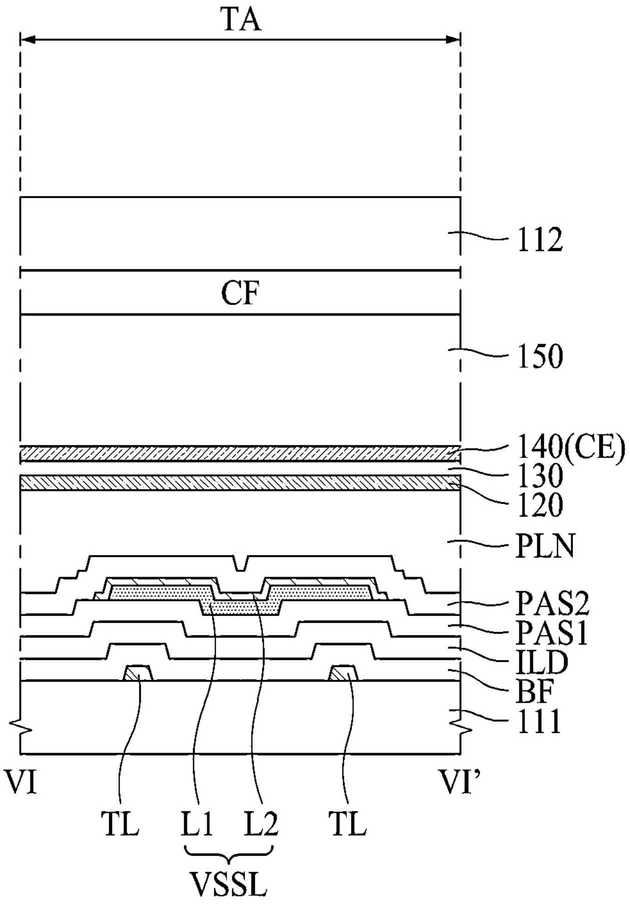
FIG. 14 is a cross-sectional view illustrating an example of line VI-VI' of FIG. 13.
Figure 15:
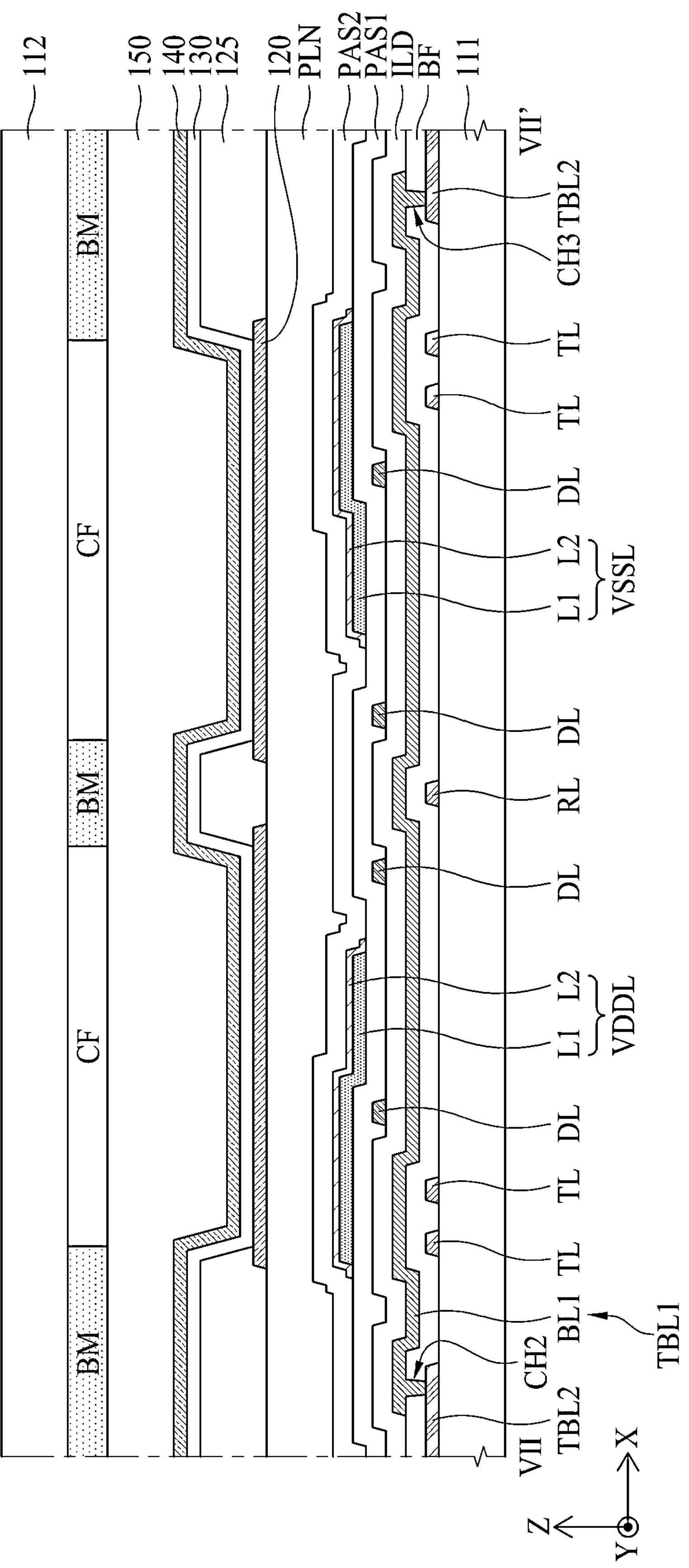
FIG. 15 is a cross-sectional view illustrating an example of line VII-VII' of FIG. 13.
Figure 16:
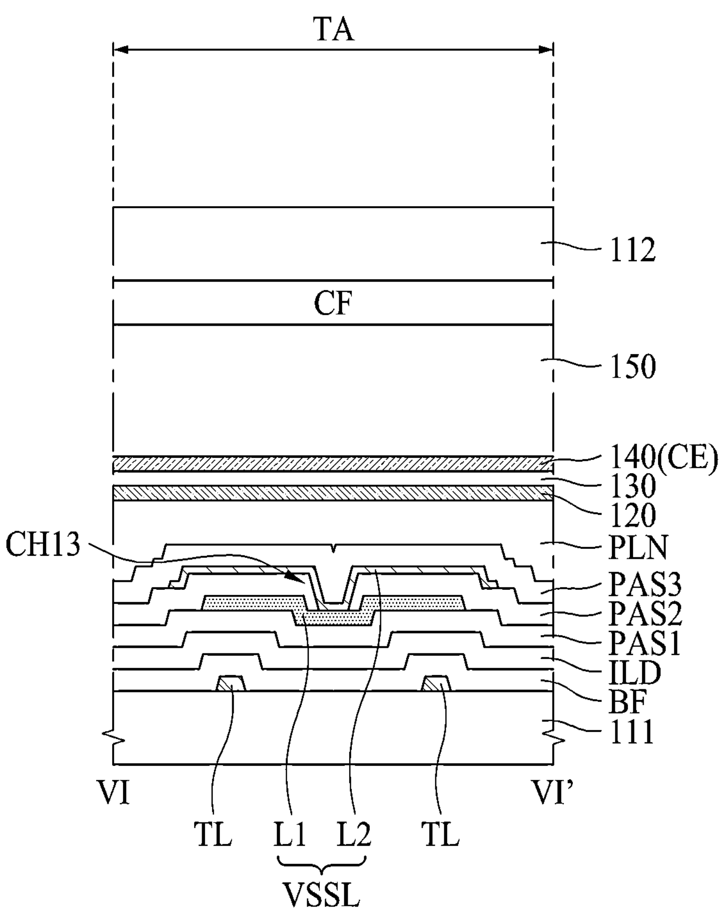
FIG. 16 is a cross-sectional view illustrating another example of line VI-VI' of FIG. 13.
Figure 17:
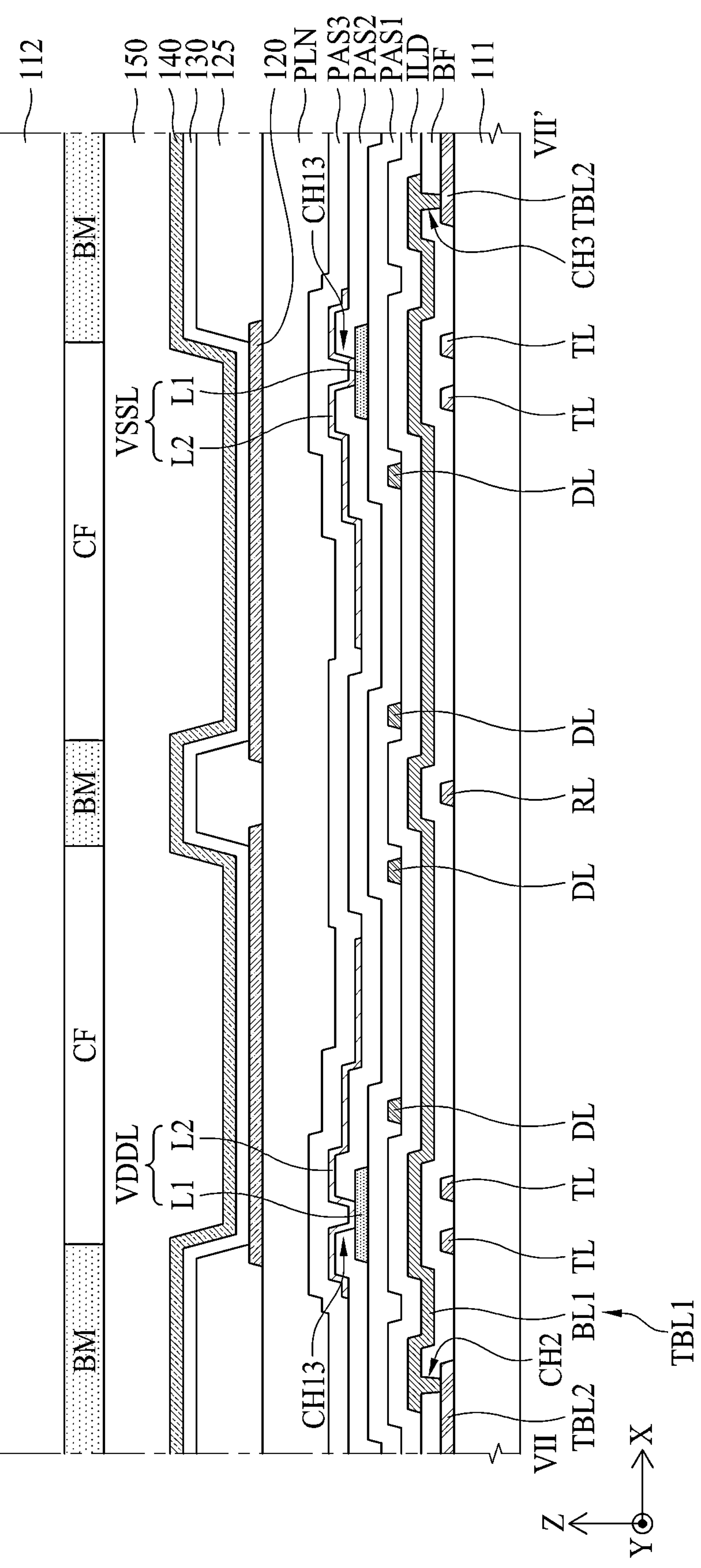
FIG. 17 is a cross-sectional view illustrating another example of line VII-VII' of FIG. 13.

In particular, FIG. 13 is a view illustrating another example of signal lines, touch lines and a touch sensor, which are provided in an area B of FIG. 2, FIG. 14 is a cross-sectional view illustrating an example of line VI-VI' of FIG. 13, and FIG. 15 is a cross-sectional view illustrating an example of line VII-VII' of FIG. 13. Further, FIG. 16 is a cross-sectional view illustrating another example of line VI-VI' of FIG. 13, and FIG. 17 is a cross-sectional view illustrating another example of line VII-VII' of FIG. 13.

The differences from the transparent display panel shown in FIGS. 3, 6 and 7 will now be described and the description of substantially the same elements as those shown in FIGS. 3, 6 and 7 will be omitted. Referring to FIGS. 13 to 17, a pixel power line VDDL and a common power line VSSL are provided between a first passivation layer PAS1 and a planarization layer PLN. Each of the pixel power line VDDL and the common power line VSSL extends in a first direction (e.g., Y-axis direction) along touch lines TL on the touch lines TL. In this instance, each of the pixel power line VDDL and the common power line VSSL can be provided to overlap the touch lines TL, and can be spaced apart from each other.

For example, in one first non-transmissive area NTA1, two first touch lines TL can be disposed between circuit areas CA1-CA4 and a transmissive area TA disposed at a left side of the circuit areas CA1-CA4. Two second touch lines TL can be disposed between the circuit areas CA1-CA4 and the transmissive area TA disposed at a right side of the circuit areas CA1-CA4.

In this instance, the pixel power line VDDL can be provided over two first touch lines TL disposed between the circuit areas CA1-CA4 and the transmissive area TA disposed at the right side of the circuit areas CA1-CA4. The pixel power line VDDL can be provided to at least partially overlap two first touch lines TL while having a width covering the two first touch lines TL.

Further, the common power line VSSL is disposed to be spaced apart from the pixel power line VDDL. The common power line VSSL can also be provided over two second touch lines TL disposed between the circuit areas CA1-CA4 and the transmissive area TA disposed at the right side of the circuit areas CA1-CA4. The common power line VSSL can be provided to at least partially overlap two second touch lines TL while having a width covering the two second touch lines TL.

Also, each of the pixel power line VDDL and the common power line VSSL extend in a second direction (e.g., X-axis direction) along a first touch bridge line TBL1 over the first touch bridge line TBL1. Each of the pixel power line VDDL and the common power line VSSL can also be provided to at least partially overlap the first touch bridge line TBL1.

Further, the pixel power line VDDL can be protruded from one side and extend in the second direction (e.g., X-axis direction) toward the common power line VSSL. The pixel power line VDDL can also be provided to overlap at least a portion of the first touch bridge line TBL1 over the first touch bridge line TBL1. When the first touch bridge line TBL1 includes a first branch line BL1 and a second branch line BL2, the pixel power line VDDL can be provided to at least partially overlap the first and second branch lines BL1 and BL2 while having a width covering the first and second branch lines BL1 and BL2.

In addition, the common power line VSSL can protrude from one side and extend in the second direction (e.g., X-axis direction) toward the pixel power line VDDL. The common power line VSSL can also be provided to overlap at least a portion of the first touch bridge line TBL1 over the first touch bridge line TBL1. When the first touch bridge line TBL1 includes a first branch line BL1 and a second branch line BL2, the common power line VSSL can be provided to at least partially overlap the first and second branch lines BL1 and BL2 while having a width covering the first and second branch lines BL1 and BL2.

The common power line VSSL provided in an area overlapped with the first touch bridge line TBL1 can also be spaced apart from the pixel power line VDDL provided in an area overlapped with the first touch bridge line TBL1. Therefore, at least a portion of each of the first and second branch lines BL1 and BSL2 can be exposed without being covered by the pixel power line VDDL and the common power line VSSL. When any one of the first branch line BL1 and the second branch line BL2 is short-circuited with another signal line, the area of the short-circuited branch line exposed without being covered by the pixel power line VDDL and the common power line VSSL, can be cut by a laser.

In one embodiment, each of the pixel power line VDDL and the common power line VSSL can include a first line L1 and a second line L2 provided between first and second passivation layers PAS1 and PAS2 as shown in FIGS. 14 and 15. The first line L1 can include a metal having resistance lower than that of the second line L2. For example, the first line L1 can include copper (Cu) having low resistance, but is not limited thereto. The first line L1 can also be thicker than the second line L2 in order to reduce total resistance.

Further, the second line L2 can be directly provided on the first line L1. The second line L2 can also be provided to at least partially cover an upper surface of the first line L1, thereby protecting the upper surface of the first line L1 and preventing the first line L1 from being corroded. The second line L2 can include a material having an oxidation degree lower than that of the first line L1. For example, the second line L2 can include ITO, but is not necessarily limited thereto.

In another embodiment, each of the pixel power line VDDL and the common power line VSSL can include a first line L1 provided between the first and second passivation layers PAS1 and PAS2 and a second line L2 provided over the second passivation layer PAS2 as shown in FIGS. 16 and 17. That is, the first line L1 and the second line L2 can be disposed on their respective layers different from each other with the second passivation layer PAS2 interposed therebetween.

In this instance, the second line L2 can be electrically connected to the first line L1 through a third contact hole CH13 passing through the second passivation layer PAS2. The second line L2 can be connected to the first line L1 through a plurality of thirteenth contact holes CH13. A third passivation layer PAS3 can also be further disposed over the second line L2.

When the second line L2 is provided over the second passivation layer PAS2, a distance between the second line L2 and the first touch bridge line TBL1 can be increased. Therefore, the parasitic capacitance between the first touch bridge line TBL1 and the second line L2 can be reduced.

Further, the pixel power line VDDL can include a first line L1 and a second line L2 in an area overlapped with the touch line TL. The pixel power line VDDL can include only a second line L2 in an area overlapping with the first touch bridge line TBL1. In addition, the common power line VSSL can also include a first line L1 and a second line L2 in an area overlapped with the touch line TL. The common power line VSSL can include only a second line L2 in an area overlapped with the first touch bridge line TBL1. In this way, as the second line L2 can be only provided on the first touch bridge line TBL1 provided on the same layer as the gate electrode GE1 of the driving transistor DTR, parasitic capacitance affecting the first touch bridge line TBL1 can be prevented from being excessively increased by sufficiently making sure of a distance between the first touch bridge line TBL1 and the pixel power line VDDL and a distance between the first touch bridge line TBL1 and the common power line VSSL.

When the touch contact electrode TCT provided in the transmissive area TA is provided on the same layer as the pixel power line VDDL and the common power line VSSL, the touch contact electrode TCT can include a first touch contact electrode TCT1 provided between the first and second passivation layers PAS1 and PAS2 and a second touch contact electrode TCT2 provided on the second passivation layer PAS2. That is, the first touch contact electrode TCT1 and the second touch contact electrode TCT2 can be disposed on their respective layers different from each other with the second passivation layer PAS2 interposed therebetween, in the same manner as the pixel power line VDDL and the common power line VSSL. In this instance, the second touch contact electrode TCT2 can be electrically connected to the first touch contact electrode TCT1 through a separate contact hole (not shown).

In the transparent display panel 110 according to another embodiment of the present disclosure, a plurality of touch lines TL can be provided on the same layer as a light-shielding layer LS, thereby ensuring a distance from a first electrode layer 120 of a light emitting element OLED as much as possible. Also, the pixel power line VDDL and the common power line VSSL can be provided between the touch lines TL and the first electrode layer 120 of the light emitting element OLED.

In addition, because the touch lines TL are disposed in a first non-transmissive area NTA1 having a small area, the touch lines TL are provided below the light emitting element to overlap the first electrode layer 120 of the light emitting element and are disposed to be adjacent to the other signal lines SL1 and SL2. Therefore, the parasitic capacitance can be generated among the touch lines TL, the first electrode layer 120 of the light emitting element and the other signal lines SL1 and SL2. The parasitic capacitance among the touch lines TL, the first electrode layer 120 of the light emitting element and the other signal lines SL1 and SL2 can also affect a touch recognition rate.

As described above, the parasitic capacitance can be generated between a plurality of signal lines RL, VDDL, DL, SCANL and VSSL and the light emitting element. In particular, when a current value of the first electrode layer 120 of the light emitting element is increased, the parasitic capacitance is increased between the touch line TL and the anode electrode 120 and the touch sensor TS can recognize a touch in error even though there is no touch. In this way, the touch recognition rate can be reduced due to the parasitic capacitance.

A current can also unstably occur even in the light emitting element due to the parasitic capacitance generated between the first electrode layer 120 and the touch line TL. When the parasitic capacitance exists between the light emitting element and the touch line TL, a current flowing through the light emitting element can be increased and reduced whenever a change occurs in a touch sensing voltage applied to the touch line TL. Therefore, a luminance deviation is generated in the light emitting element, and flickering due to the luminance deviation can be visible to a viewer.

In addition, the transparent display panel 110 according to another embodiment of the present disclosure includes the pixel power line VDDL and the common power line VSSL between the touch lines TL and the first electrode layer 120 of the light emitting element OLED, whereby occurrence of a parasitic capacitance between the touch lines TL and the first electrode layer 120 of the light emitting element OLED can be blocked or minimized.

Also, the transparent display panel 110 according to another embodiment of the present disclosure can include the pixel power line VDDL and the common power line VSSL between the first touch bridge line TBL1 electrically connected to any one of the touch lines TL and the first electrode layer 120 of the light emitting element OLED. The first touch bridge line TBL1 can be provided on a layer different from the light-shielding layer LS. For example, the first touch bridge line TBL1 can be disposed on the same layer as the gate electrode GE1 of the driving transistor DTR. Since the first touch bridge line TBL1 is disposed on the light-shielding layer LS, a distance from the first electrode layer 120 can be shorter than that from the touch lines TL. Therefore, the parasitic capacitance between the first touch bridge line TBL1 and the first electrode layer 120 can be greater than that between the touch lines TL and the first electrode layer 120.

Further, the transparent display panel 110 according to another embodiment of the present disclosure includes the pixel power line VDDL and the common power line VSSL between the first touch bridge line TBL1 and the first electrode layer 120 of the light emitting element OLED, whereby occurrence of the parasitic capacitance between the first touch bridge line TBL1 and the first electrode layer 120 of the light emitting element OLED can be blocked or minimized.

In addition, the transparent display panel 110 can minimize parasitic capacitance between the touch lines TL and the first electrode layer 120 of the light emitting element OLED and between the first touch bridge line TBL1 and the first electrode layer 120 of the light emitting element OLED. Therefore, the touch recognition rate of the transparent display panel 110 can be significantly improved. In addition, a current can occur more stably in the light emitting element OLED.

Also, a constant voltage is applied to the pixel power line VDDL and the common power line VSSL, the parasitic capacitance generated between the pixel power line VDDL and the common power line VSSL and the touch lines TL and the touch bridge line TBL can be predicted, thereby facilitating touch control. The transparent display panel 110 can also reduce touch driving noise.

Further, the pixel power line VDDL and the common power line VSSL can be provided between the touch lines TL and the planarization layer PLN, and can be provided between the first touch bridge line TBL1 and the planarization layer PLN. Also, the touch lines TL and the first touch bridge line TBL1 can prevent parasitic capacitance with other signal line or electrode from being formed with the planarization layer PLN interposed therebetween. Therefore, the transparent display panel 110 according to another embodiment of the present disclosure can significantly reduce the influence on the touch line TL and the first touch bridge line TBL1 even though a dielectric constant of the planarization layer PLN is changed due to a temperature increase. That is, the transparent display panel 110 can minimize occurrence of a ghost touch defect.

Also, the pixel power line VDDL and the common power line VSSL can be disposed to be spaced apart from each other, thereby making sure of a space for irradiating laser to one of the first branch line BL1 and the second branch line BL2, in which short-circuit occurs. In addition, the transparent display panel 110 according to another embodiment of the present disclosure includes the first line L1 and the second line L2 in the area overlapped with the touch line TL, and includes only the second line L2 in the area overlapped with the first touch bridge line TBL1, thereby ensuring a sufficient distance between the power lines VDDL and VSSL and the first touch bridge line TBL1. Therefore, the transparent display panel 110 can prevent the parasitic capacitance affecting the first touch bridge line TBL1 from being excessively increased.

According to the present disclosure, the following advantages are achieved.

First, the touch sensor electrode of the touch sensor and the cathode electrode of the light emitting element can be simultaneously formed using the first undercut structure, whereby the touch process can be simplified and a separate mask for the touch sensor electrode is not required. Therefore, the present disclosure can optimize the process and reduce the production energy.

Also, in the present disclosure, the contact areas where the touch sensor electrode and the touch contact electrode contact each other can be provided using the second undercut structure, so that a contact defect rate between the touch sensor electrode and the touch contact electrode can be reduced. Therefore, a difference in an area of the touch sensor in which touch sensing is possible can be reduced between the blocks, and the parasitic capacitance deviation can be reduced. The touch performance can also be improved.

Further, the touch sensor electrode can be deposited on the second organic patterns. In addition, the surface area of the touch sensor electrode can be increased, and in case of a finger's touch, the distance between the touch sensor and the finger can be reduced. Therefore, the capacitance generated between the finger and the touch sensor can be increased so that touch performance can be increased.

In addition, the pixel power line and the common power line can be provided between the touch lines and the anode electrode of the light emitting element, so that occurrence of parasitic capacitance between the touch lines and the anode electrode of the light emitting element can be blocked or minimized.

The pixel power line and the common power line can also be provided between the touch bridge line and the anode electrode of the light emitting element, so that occurrence of parasitic capacitance between the first touch bridge line and the anode electrode of the light emitting element can be blocked or minimized. Therefore, the touch recognition rate can be significantly improved, and the current of the light emitting element can be stably generated.

Further, as the pixel power line and the common power line are provided between the touch lines and the planarization layer and between the touch bridge line and the planarization layer, even though the dielectric constant of the planarization layer is changed due to the temperature increase, the influence on the touch line and the touch bridge line can be significantly reduced. That is, the occurrence of the ghost touch defect can be minimized.

In addition, the first line and the second line can be provided in the area overlapped with the touch line, and the second line can be only provided in the area overlapped with the touch bridge line, thereby ensuring the sufficient distance between the power lines and the touch bridge line. Therefore, the parasitic capacitance that affects the touch bridge line can be prevented from being increased.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, the scope of the present disclosure is defined by the accompanying claims and it is intended that all variations or modifications derived from the meaning, scope and equivalent concept of the claims fall within the scope of the present disclosure.

What is claimed is:

1. A display device comprising:

a glass substrate including a display area and a non-display area;

a light shielding layer and a plurality of metal lines on the glass substrate;

a buffer layer provided on the light shielding layer and the plurality of metal lines;

at least one transistor disposed on the buffer layer and including an active layer formed of an oxide-based semiconductor, and the active layer overlapped with the light shielding layer;

a data line arranged adjacent to the plurality of metal lines and in parallel to the plurality of metal lines;

a pixel power line disposed on the plurality of metal lines and overlapped with the plurality of metal lines;

a planarization layer disposed on the pixel power line, the plurality of metal lines and the transistor;

a light emitting element including a first electrode, a light emitting layer and a second electrode provided on the planarization layer;

an encapsulation layer provided over the second electrode and including at least one organic layer and one inorganic layer;

a bank on the first electrode;

color filters in each of a plurality of subpixels on the encapsulation layer; and a black matrix between the color filters, wherein the black matrix overlaps the bank, wherein the plurality of metal lines has a mesh structure, and wherein the plurality of metal lines comprising a first metal line and a second metal line, and the second metal line is intersected to the first metal line and connected to the first metal line.

2. The display device of claim 1, wherein the first metal line extends in a first direction, and the second metal line extends in a second direction, further comprising a scan line disposed parallel to the second metal line and intersected with the first metal line.

3. The display device of claim 1, further comprising a sensing line intersected with the second metal line.

4. The display device of claim 1, wherein the first metal line is a touch line and the second metal line is a touch bridge line.

5. The display device of claim 1, wherein an opened area is disposed in at least one side of a light emission area, and wherein at least a portion of the second electrode is separated by the opened area.

6. The display device of claim 2, further comprising:

a touch line on the glass substrate in a non-transmissive area;

a touch bridge line in the non-transmissive area;

a touch contact electrode electrically connected to the touch bridge line;

a touch sensor in a transmissive area and including a touch sensor electrode overlapping with the touch contact electrode; and a cathode electrode disposed on the glass substrate, wherein the touch sensor contacts the touch contact electrode so the touch sensor is electrically connected to the touch bridge line, wherein the cathode electrode is separated from the touch sensor via an undercut area, and wherein the cathode electrode and the touch sensor comprise a same material and are formed on a same layer.

7. The display device of claim 6, wherein the contact electrode comprises:

a first touch contact electrode layer; and a second touch contact electrode layer, and wherein the first touch contact electrode layer has a lower resistance than a resistance of the second touch contact electrode layer.

8. The display device of claim 7, wherein the second touch contact electrode layer is disposed on a passivation layer on the glass substrate and covers the first touch contact electrode layer.

9. The display device of claim 7, further comprising:

a high resistance line disposed on the glass substrate, wherein the first touch contact electrode layer is electrically connected to the high resistance line disposed on the glass substrate, and wherein the touch contact electrode, the high resistance line and the touch bridge line are disposed beneath the touch sensor.

10. The display device of claim 9, wherein the high resistance line is electrically connected to the touch bridge line.

11. The display device of claim 6, wherein the touch sensor includes a plurality of open areas separated from each other.

12. The display device of claim 6, wherein the touch sensor contacts the touch contact electrode at a first area (CTA) of a first undercut area and contacts the touch contact electrode at a second area (CTA) of a second undercut area spaced apart from the first undercut area.

13. The display device of claim 12, wherein the touch sensor does not contact the touch contact electrode at a third area between the first area and the second area.

14. The display device of claim 7, wherein a material of the second touch contact electrode layer has an oxidation degree lower than an oxidation degree of the first touch contact electrode layer.

15. The display device of claim 14, wherein the second touch contact electrode layer has an area wider than an area of the first touch contact electrode layer.

16. The display device of claim 6, wherein the touch contact electrode and the pixel power line are a same layer.

17. The display device of claim 6, wherein the touch line and the light shielding layer are a same layer, and the pixel power line overlaps the touch line and extended in the first direction.

18. The display device of claim 17, wherein the pixel power line includes:

a first line including a first conductive material;

a second line on the first line and including a second conductive material; and a passivation layer between the first line and the second line, wherein the second line is electrically connected to the first line through a contact hole passing through the passivation layer, and wherein the second line of the pixel power line overlaps the touch bridge line.

19. The display device of claim 6, wherein the touch bridge line is between the light shielding layer and the pixel power line, and the pixel power line overlapped with the touch line extends in the second direction along the touch bridge line in an area overlapped with the touch bridge line.

* * * * *